United States Patent
Aneja et al.

(10) Patent No.: US 8,230,678 B2
(45) Date of Patent: Jul. 31, 2012

(54) TREATMENT OF DIESEL ENGINE EXHAUST

(75) Inventors: Rakesh Aneja, Farmington Hills, MI (US); Jeffrey M. Girbach, Farmington, MI (US); Jeffrey A. Begeman, Newport, MI (US); Matthew Oaks, Taylor, MI (US); Jason T. Krajewski, Portland, OR (US); Andrew S. McLandress, Portland, OR (US); Napolyon Isikbay, Hillsboro, OR (US)

(73) Assignee: Daimler Trucks North America LLC, Portland, OR (US)

(*) Notice: Subject to any disclaimer, the term of this patent is extended or adjusted under 35 U.S.C. 154(b) by 826 days.

(21) Appl. No.: 12/214,271

(22) Filed: Jun. 16, 2008

(65) Prior Publication Data

US 2008/0314033 A1 Dec. 25, 2008

Related U.S. Application Data

(60) Provisional application No. 61/057,761, filed on May 30, 2008, provisional application No. 60/936,738, filed on Jun. 21, 2007.

(51) Int. Cl.
*F01N 3/00* (2006.01)
(52) U.S. Cl. .................................... 60/295; 60/301
(58) Field of Classification Search .............. 60/286, 60/287, 301, 311, 324, 299; 220/562, 563; 422/171, 177, 180, 168; 55/350.1, 410, 482, 55/484, DIG. 30
See application file for complete search history.

(56) References Cited

U.S. PATENT DOCUMENTS

| | | | |
|---|---|---|---|
| 2,758,845 A | 8/1956 | Doyle et al. | |
| 2,789,032 A | 4/1957 | Bagley et al. | |
| 4,821,840 A | 4/1989 | Harwood et al. | |
| RE33,118 E | 11/1989 | Scheitlin et al. | |
| 5,594,217 A | 1/1997 | LeQuire | |
| 5,848,720 A * | 12/1998 | Logan | 220/563 |
| 5,974,791 A | 11/1999 | Hirota et al. | |
| 6,550,240 B2 | 4/2003 | Kolmanovsky et al. | |
| 6,694,727 B1 | 2/2004 | Crawley et al. | |

(Continued)

FOREIGN PATENT DOCUMENTS

WO WO 2004/038192 A1 5/2004

(Continued)

OTHER PUBLICATIONS

Office action dated Jun. 24, 2011, issued in corresponding U.S. Appl. No. 12/214,258, filed Jun. 16, 2008.

(Continued)

*Primary Examiner* — Thomas Denion
*Assistant Examiner* — Patrick Maines
(74) *Attorney, Agent, or Firm* — Klarquist Sparkman, LLP

(57) ABSTRACT

A diesel exhaust treatment system for treating exhaust gas from a diesel engine comprises at least one diesel particulate filter, at least one diesel exhaust fluid mixing chamber and at least one selective catalytic reduction converter (SCR). In one desirable embodiment, plural diesel particulate filters are arranged in parallel and plural SCRs are arranged in parallel. These components including the diesel exhaust fluid mixing chamber can be included in a common housing with the exhaust flow reversing directions a plurality of times as it passes through the treatment system from an exhaust inlet to an exhaust outlet. The housing can be coupled to one vehicle frame rail with most of the housing and components contained therein positioned outside the outer surface of the one frame ral.

19 Claims, 17 Drawing Sheets

U.S. PATENT DOCUMENTS

| | | | |
|---|---|---|---|
| 6,820,417 B2 * | 11/2004 | May et al. | 60/297 |
| 6,871,489 B2 | 3/2005 | Tumati et al. | |
| 6,874,315 B2 | 4/2005 | Nakatani et al. | |
| 6,877,312 B2 | 4/2005 | Nakatani et al. | |
| 6,955,162 B2 * | 10/2005 | Larson et al. | 123/568.11 |
| 7,032,376 B1 | 4/2006 | Webb et al. | |
| 7,055,311 B2 | 6/2006 | Beutel et al. | |
| 7,210,288 B2 | 5/2007 | Bandl-Konr | |
| 7,245,033 B2 | 7/2007 | Wurtele | |
| 7,249,455 B2 | 7/2007 | Tumati et al. | |
| 7,866,143 B2 * | 1/2011 | Buhmann et al. | 60/286 |
| 2004/0112046 A1 | 6/2004 | Tumati et al. | |
| 2004/0228776 A1 | 11/2004 | Ball et al. | |
| 2005/0022515 A1 | 2/2005 | Stiermann | |
| 2005/0167968 A1 | 8/2005 | Mabuchi et al. | |
| 2006/0153748 A1 * | 7/2006 | Huthwohl et al. | 422/172 |
| 2006/0156712 A1 * | 7/2006 | Buhmann et al. | 60/297 |
| 2006/0266019 A1 | 11/2006 | Ricart-Ugaz | |
| 2006/0266022 A1 * | 11/2006 | Woerner et al. | 60/295 |
| 2007/0044457 A1 | 3/2007 | Upadhyay et al. | |
| 2007/0175208 A1 | 8/2007 | Bandl-Konrad et al. | |
| 2008/0028754 A1 | 2/2008 | Tumati et al. | |
| 2008/0127635 A1 * | 6/2008 | Hirata et al. | 60/286 |

FOREIGN PATENT DOCUMENTS

WO    WO 2004038192 A1 *    5/2004

OTHER PUBLICATIONS

Claims as currently pending in U.S. Appl. No. 12/214,258 to Boeckenhoff.

* cited by examiner

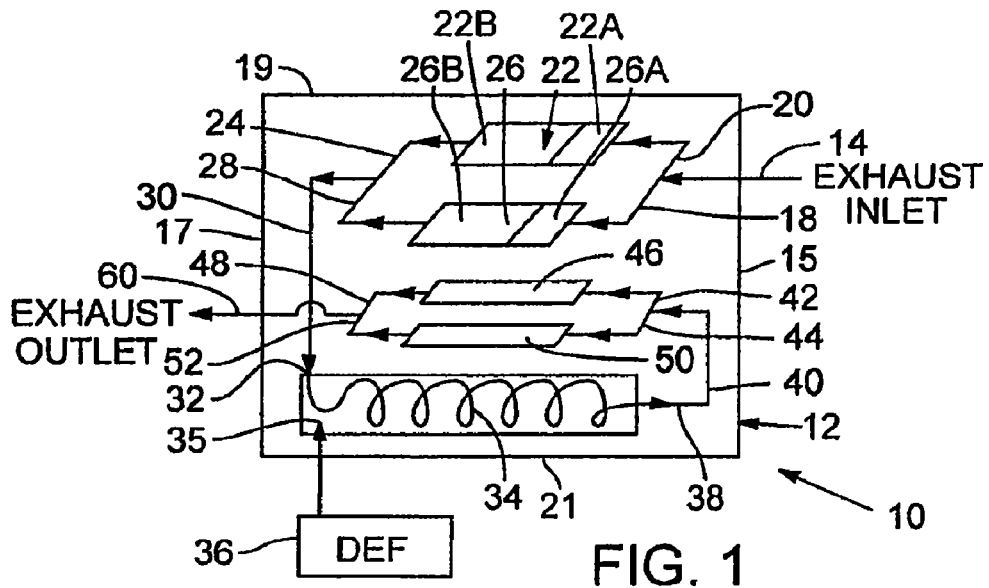
FIG. 1
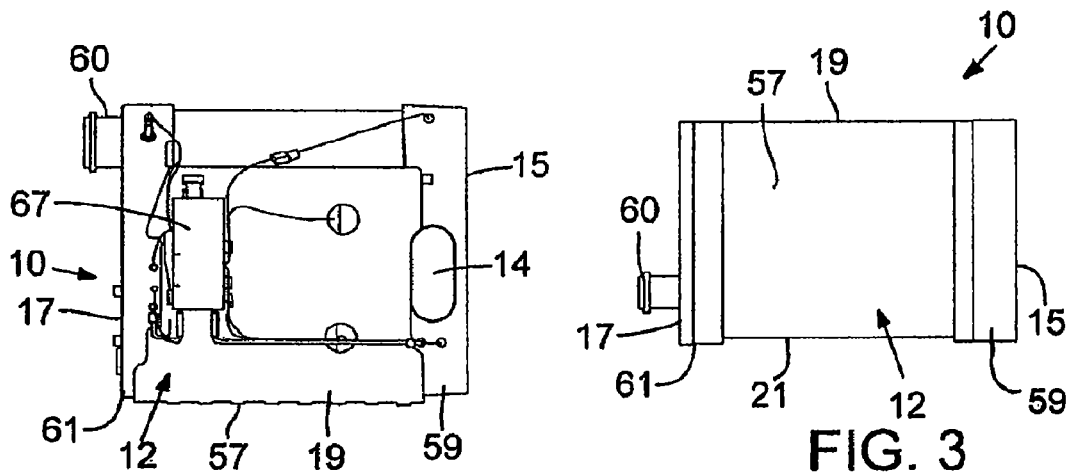
FIG. 2
FIG. 3
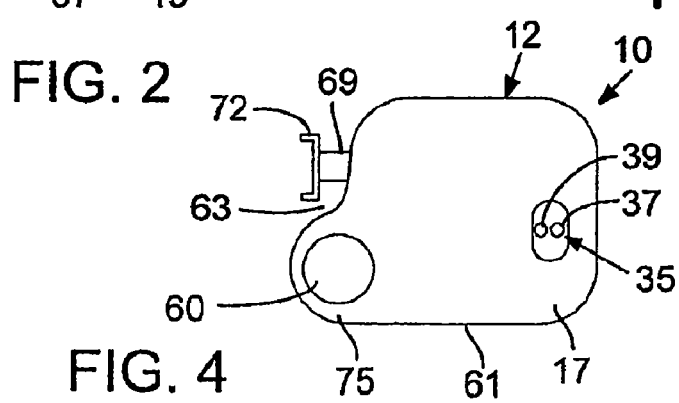
FIG. 4

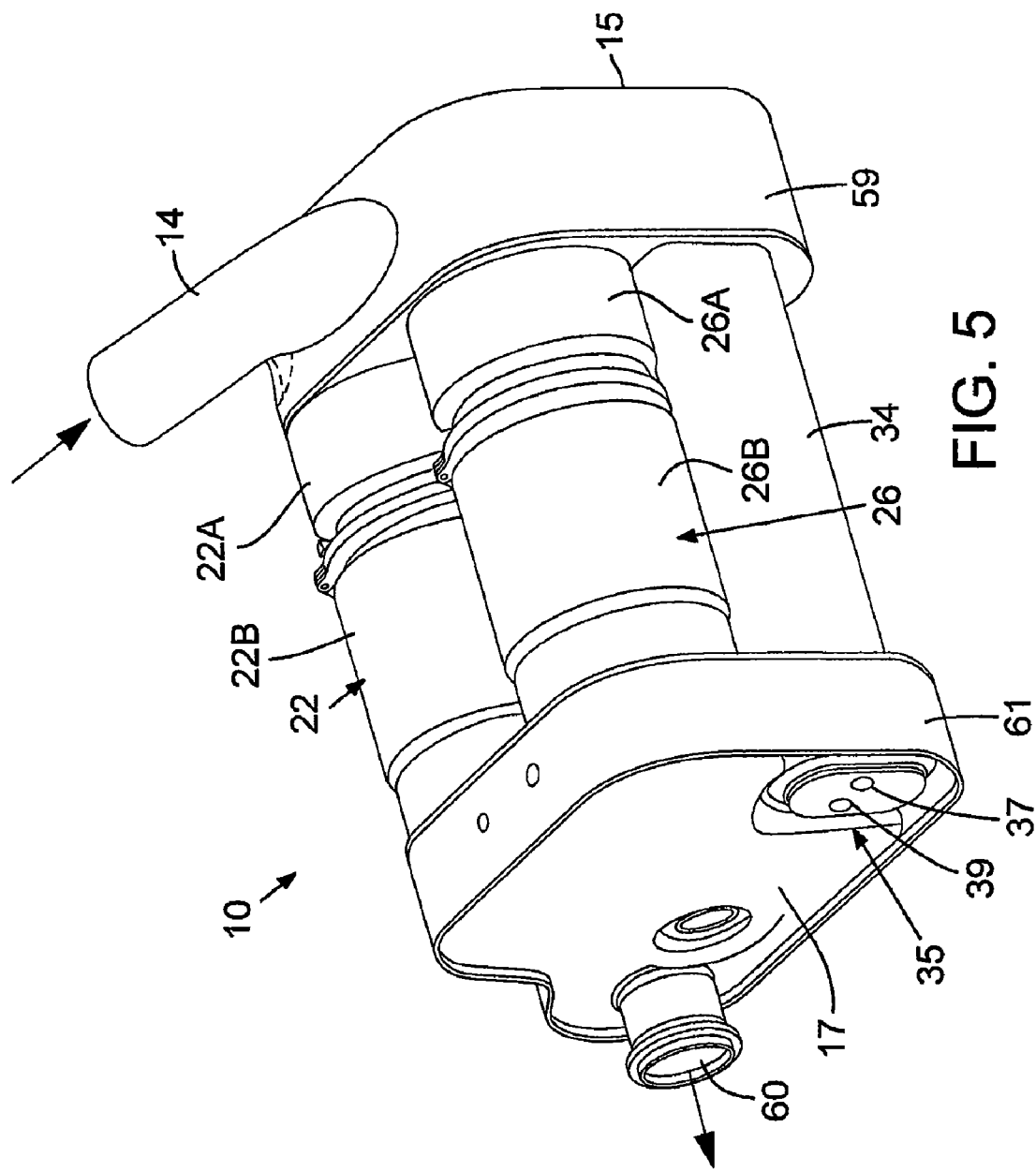

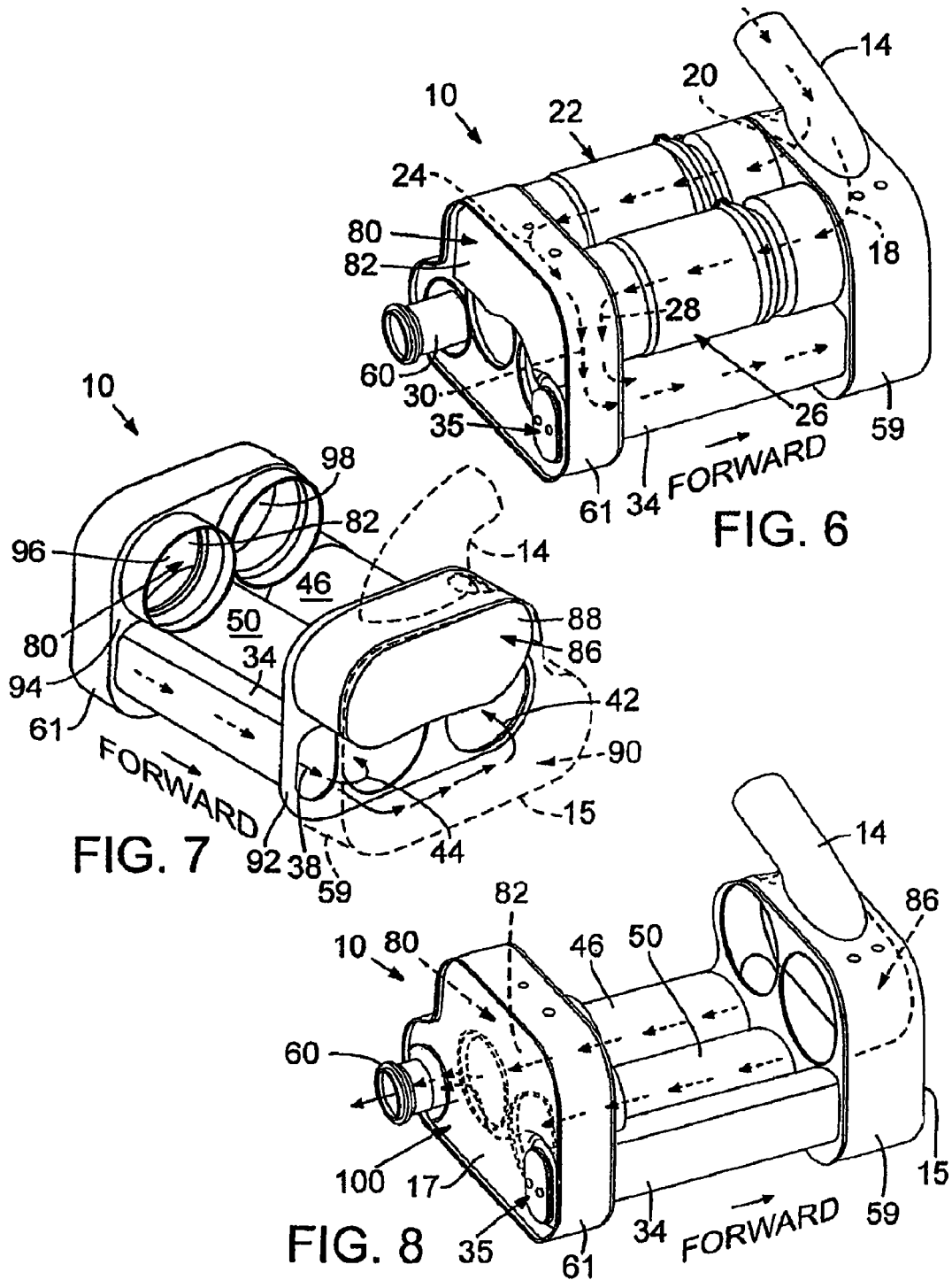

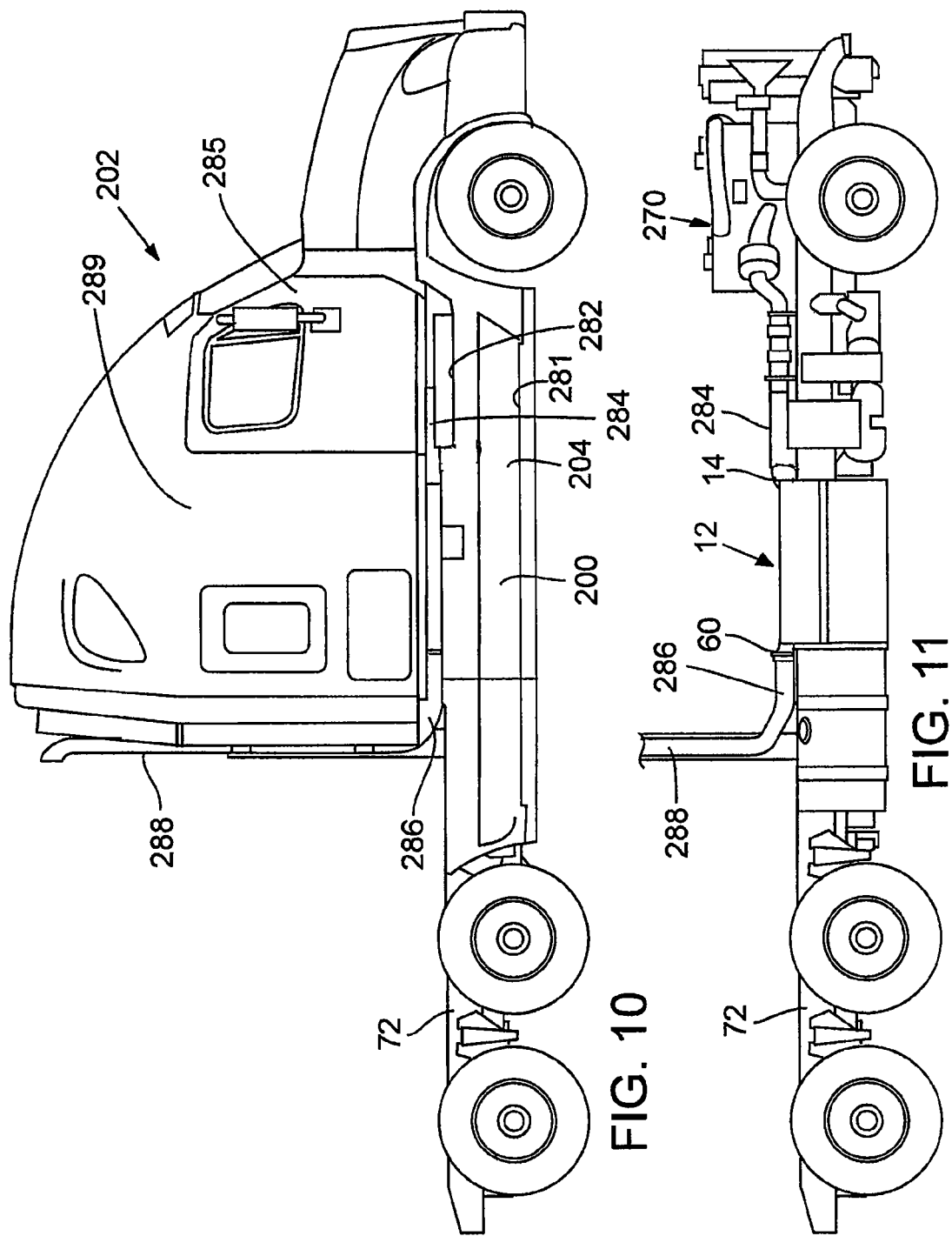

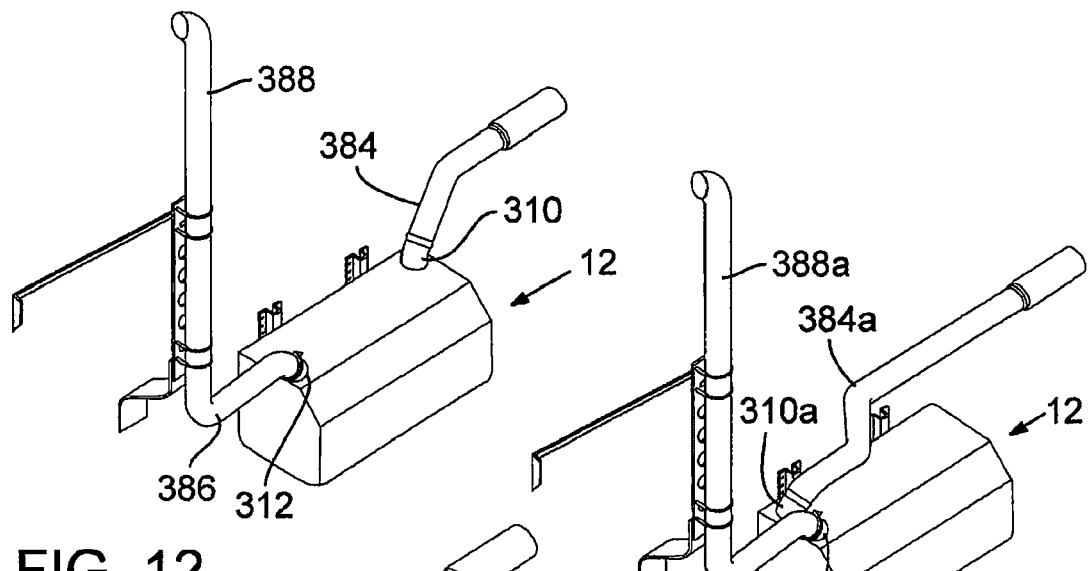
FIG. 12
FIG. 13
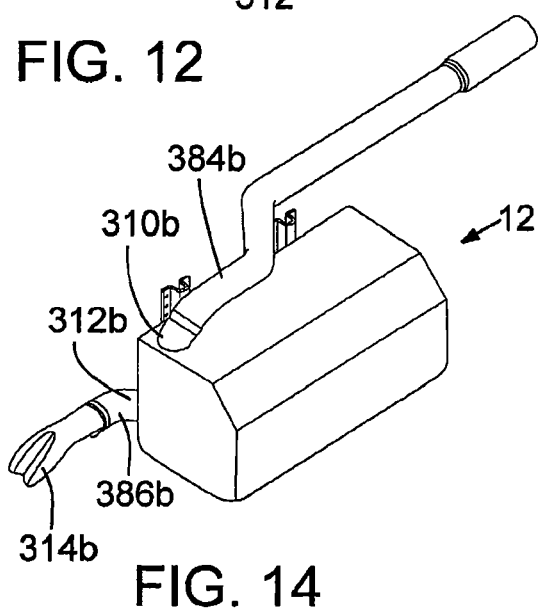
FIG. 14
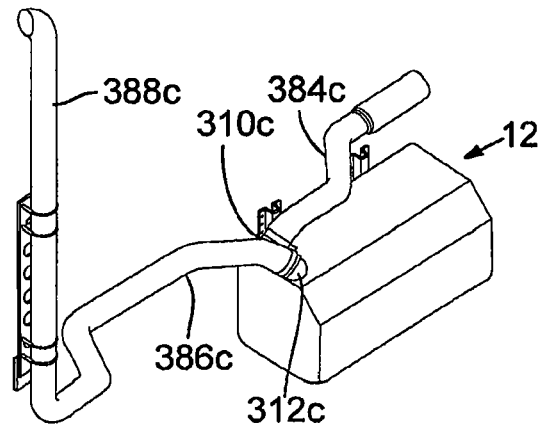
FIG. 15

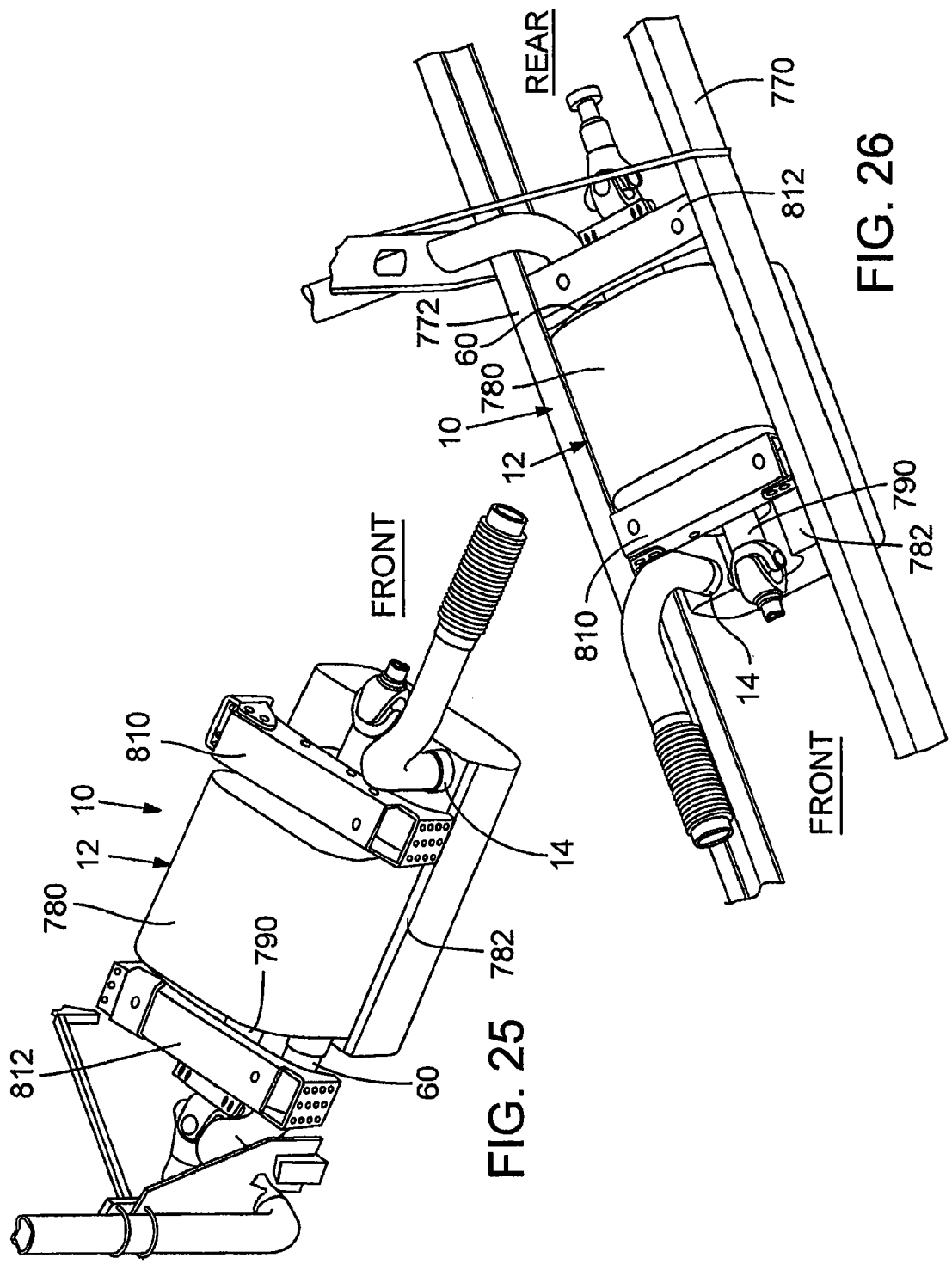

TREATMENT OF DIESEL ENGINE EXHAUST

CROSS REFERENCE TO RELATED APPLICATION

This application claims the benefit of U.S. Provisional Application 60/936,738 entitled Treatment of Diesel Engine Exhaust, filed on Jun. 21, 2007. This application also claims the benefit of U.S. Provisional Application 61/057,761 entitled Treatment of Diesel Engine Exhaust and filed on May 30, 2008.

TECHNICAL FIELD

The technology disclosed herein relates to the treatment of diesel engine exhaust and more specifically to the treatment of diesel engine exhaust from land vehicles, such as exhaust from heavy duty diesel engines for trucks.

SUMMARY

In accordance with the technology disclosed herein, diesel engine exhaust aftertreatment systems and methods for treating the exhaust from a diesel engine, such as from heavy duty diesel engines, are disclosed.

In accordance with one embodiment, an apparatus in accordance with the disclosure can comprise at least one diesel particulate filter (DPF), at least one diesel exhaust fluid mixing chamber to which treatment chemicals such as a urea water mixture is added for the purpose of treating exhaust, and at least one selective catalytic reduction converter (hereinafter sometimes called SCR or SCR converter), all contained within a common housing.

In a particularly desirable embodiment, an exhaust treatment flow path passes from an exhaust inlet, through dual elongated parallel diesel particulate filters, through a diesel exhaust fluid mixing chamber and through dual elongated parallel SCR converters to an exhaust outlet. The exhaust can be separated into two exhaust streams for delivery to the diesel particulate filters and then be recombined for delivery to the mixing chamber. From an outlet of the mixing chamber, the exhaust can be separated into plural exhaust streams for delivery to respective SCR converters. Following treatment by the SCR converters, the exhaust can be rejoined into a common stream for exiting from an exhaust outlet of the housing.

In accordance with one embodiment, the housing can be coupled or mounted to one of the frame rails of a vehicle having a pair of elongated frame rails with, for example, the housing being oriented so that the length of the housing extends in the same direction as the length of the frame rails. The housing can be outside of the space between the frame rails. The housing can be mounted to the adjacent vehicle frame rail, such as using mounting brackets. The term "outer" refers to a location farther from the longitudinal center line of the vehicle. In one desirable embodiment, an inwardly protruding portion of the housing can extend inwardly and at least partially beneath the adjacent frame rail with the rest of the housing outside of the adjacent frame rail.

In one specific embodiment, the housing is positioned adjacent to the door of a cab of a vehicle and comprises steps for ingress and egress to and from the interior of the cab of the vehicle. For example, the housing can be formed with one or more shelves to which steps are mounted. Alternatively, housing can comprise step-shaped indentations forming one or more steps accessible to a user. Treads or tread like structures can be placed on these steps. As yet another alternative, the housing can support a fairing which is coupled to the housing with the fairing comprising steps or a step-carrying structure. As a still further alternative, one or more steps can be coupled, such as by mounting brackets, to an outer surface of the housing. As yet a further alternative, steps comprising mounting brackets designed for mounting to brackets secured to the housing can be used to mount the steps in place. In this disclosure, the term "coupled to" or "coupling" means both direct connection between two components as well as indirect connection of two components through one or more other components. Also, in this disclosure the terms "a" or "an" or "at least one" include both the singular and the plural. That is, for example, the reference to "a" diesel particulate filter encompasses an apparatus with one diesel particulate filter as well as an apparatus with more than one diesel particulate filter as in each case a diesel particulate filter is present.

In yet another embodiment, the housing can be coupled to the frame rail at a location rearwardly of the cab of the vehicle, such as at a mid-chassis location referring to an intermediate location rearwardly of a door of a vehicle and forwardly of the rear of the vehicle. Desirably the housing can be coupled to a frame rail such as described above. Exhaust gas from a diesel engine can be delivered to the housing with the housing containing exhaust treating components, such as described above, for treating engine exhaust.

The housing can comprise a plurality of housing portions or sections assembled together to form the housing for the exhaust gas treatment components. In a particularly desirable embodiment, the housing is configured such that exhaust reverses direction as it travels through the housing with a desirable gas flow path including three such reversals of gas flow direction. For example, the exhaust can flow generally in a first direction through one or more diesel particulate filters, reverse direction to flow through a diesel exhaust fluid mixing chamber, and reverse direction again to flow through one or more SCR converters.

In accordance with an embodiment, an exhaust gas treatment system for treating exhaust gases from a diesel engine of a land vehicle, the land vehicle comprising first and second elongated vehicle frame rails that extend in a lengthwise direction of the vehicle, the exhaust gas treatment system comprising: a housing, which can comprise plural housing components or portions, for coupling to at least one of the frame rails and comprising an exhaust gas inlet and an exhaust gas outlet; first and second diesel particulate filters within the housing, each diesel particulate filter comprising a diesel particulate filter inlet coupled to the exhaust gas inlet and a diesel particulate filter outlet; a diesel exhaust fluid mixing chamber within the housing, the mixing chamber comprising a mixing chamber inlet coupled to each of the diesel particulate filter outlets and a mixing chamber outlet; and first and second selective catalytic reduction (SCR) converters within the housing, each SCR converter comprising an SCR inlet coupled to the mixing chamber outlet and an SCR outlet coupled to the exhaust gas outlet.

In accordance with an embodiment, the first and second diesel particulate filters can be elongated and arranged in parallel, and the first and second SCR converters can be elongated and arranged in parallel. Also, the diesel exhaust fluid mixing chamber can be elongated and positioned in parallel with the diesel particulate filters and the SCR converters.

In accordance with another aspect of an embodiment of an exhaust gas treatment system, first and second diesel particulate filters can comprise an exhaust gas flow path through the diesel particulate filters that extends generally in a first direction through the first and second diesel particulate filters from respective diesel particulate filter inlets to respective diesel particulate filter outlets; a diesel exhaust fluid mixing chamber can be oriented to define an exhaust gas flow path through the mixing chamber that is generally in a second direction opposite to the first direction; and first and second SCR converters can be oriented to define an exhaust gas flow path through the SCR converters that is generally in the first direction. In this embodiment, the first, second and third directions can be parallel to the first and second vehicle frame rails when the housing is coupled to at least one of the vehicle frame rails.

In accordance with an embodiment, an exhaust gas treatment system comprises an exhaust gas flow path communicating from an exhaust inlet to an exhaust outlet; first and second diesel particulate filters, a diesel exhaust fluid mixing chamber and first and second SCR converters being included in the exhaust gas flow path, the diesel particulate filters being included in respective first and second sections of the exhaust gas flow path, the SCR converters being included in respective third and fourth sections of the exhaust gas flow path, a housing comprising a first transition portion in the exhaust gas flow path coupling the exhaust inlet to the diesel particulate filter inlets, a second transition portion coupling diesel particulate filter outlets to a diesel exhaust fluid mixing chamber inlet, a third transition portion in the exhaust gas flow path coupling a diesel exhaust fluid mixing chamber outlet to SCR converter inlets, and a fourth transition portion in the exhaust gas flow path coupling SCR converter outlets to the exhaust gas outlet. Also, the housing can comprise first and second housing end portions, the first housing end portion comprising the first and third transition portions and the second housing end portions comprising the second and fourth transition portions. In addition, as a desirable option, in an embodiment, the first end portion can be positioned forwardly toward the front of a land vehicle when the housing is coupled to at least one of the frame rails of the land vehicle.

In accordance with an embodiment, diesel particulate filters, a diesel exhaust fluid mixing chamber and SCR converters are oriented and configured such that exhaust flows from an exhaust inlet to a first transition portion and generally in a first lengthwise direction from the first transition portion through the first and second diesel particulate filters, reverses direction in a second transition portion and flows generally in a second lengthwise direction opposite to the first lengthwise direction from the second transition portion and through the diesel exhaust fluid mixing chamber and to a third transition portion, the exhaust reversing direction in the third transition portion and flowing generally in a third lengthwise direction opposite to the second direction through the first and second SCR converters to a fourth transition portion and then from the fourth transition portion to the exhaust outlet.

The housing can, in one embodiment, comprise a first housing end portion and a second housing end portion, the first and third directions being in the direction from the first housing end portion toward the second housing end portion and the second direction being in the direction from the second housing end portion toward the first housing end portion. Also, the first, second, third and fourth sections of the exhaust flow path can be parallel to one another. These sections can also be generally parallel to the first and second vehicle frame rails when the housing is coupled to at least one of the vehicle frame rails. As an alternative, at least major portions of the first, second and third lengthwise directions can be parallel to the first and second frame rails when the housing is coupled to the at least one of the first and second frame rails.

In accordance with an embodiment of a housing for an exhaust treatment system for a diesel engine, the exhaust treatment system comprising exhaust treatment components comprising at least one diesel particulate filter, a diesel exhaust fluid mixing chamber and at least one selective catalytic reduction (SCR) converter, the housing comprising: an exhaust gas inlet and an exhaust gas outlet, wherein an exhaust gas flow path is provided through the exhaust treatment components from the exhaust inlet to the exhaust outlet; a longitudinally extending protrusion, the housing being mounted to the vehicle with the frame rail positioned at least in part above the protrusion, at least one of the exhaust treatment components being positioned at least partially in the portion of the housing comprising the protrusion. The housing has a length and can be coupled by mounting brackets to at least one of the frame rails with the length of housing being oriented in the lengthwise direction.

In accordance with a method embodiment, a method of treating exhaust from a diesel engine of a land vehicle comprises: splitting an exhaust stream from an exhaust inlet into first and second exhaust streams; passing the first exhaust stream in a first direction through a first diesel particulate filter and passing the second exhaust stream in the first direction though a second diesel particulate filter; recombining the first and second exhaust streams into a third exhaust stream downstream from the first and second particulate filters; passing the third exhaust stream in a second direction opposite to the first direction, through a diesel exhaust fluid mixing chamber; splitting the third exhaust stream into fourth and fifth exhaust streams; passing the fourth exhaust stream in a third direction opposite to the second direction through a first selective catalytic reduction converter and passing the fifth exhaust stream in the third direction through a second selective catalyst reduction converter; recombining the fourth and fifth exhaust streams downstream of the first and second selective catalyst reduction converters into a sixth exhaust stream; passing the sixth exhaust stream to an exhaust outlet; and combining the first, second, third, fourth and fifth exhaust streams, first and second diesel particulate filters, the diesel exhaust fluid mixing chamber and the first and second selective catalyst reduction converters in a housing.

BRIEF DESCRIPTION OF THE DRAWINGS

FIG. 1 is a schematic illustration of one exemplary embodiment of an exhaust treatment apparatus in accordance with a first embodiment.

FIG. 2 is a top view of an exemplary housing that can be used to house the components of the embodiment shown in FIG. 1.

FIG. 3 is a side view of the housing of FIG. 2, with exhaust gas sensing and diesel exhaust fluid control components removed.

FIG. 4 is an end view of the housing of FIG. 3 looking toward an exhaust outlet of this form of housing.

FIG. 5 is a perspective view of the embodiment of FIGS. 2-4 with a portion of the housing removed to show exemplary internal components of an exhaust gas treatment apparatus.

FIGS. 6-8 illustrate the embodiment of FIG. 5 with various components of the embodiment removed for purposes of illustrating an exemplary exhaust flow path through components of this embodiment.

FIGS. 10 and 11 illustrate an embodiment of an exhaust treatment apparatus or system located at a mid or intermediate chassis location rearwardly of the door of a heavy duty truck.

FIGS. 12-14 illustrate exemplary truck exhaust treatment embodiments that show the versatility of arrangements of exhaust inlets and outlets that can be utilized in the embodiments with internal components being located within the housing to accommodate the different inlet and outlet locations.

FIGS. 15-18 illustrate examples of embodiments provided with steps for ingress and egress to and from a door of a truck to again illustrate exemplary inlet and outlet exhaust locations.

FIG. 21 comprises a sectional view taken along line 21-21 of FIG. 23. FIG. 22 comprises a sectional view taken along line 22-22 of FIG. 23.

FIGS. 25 and 26 are isometric views of an exhaust gas treatment apparatus in accordance with one embodiment of a housing with a drive shaft passageway.

DETAILED DESCRIPTION

Figure 9:
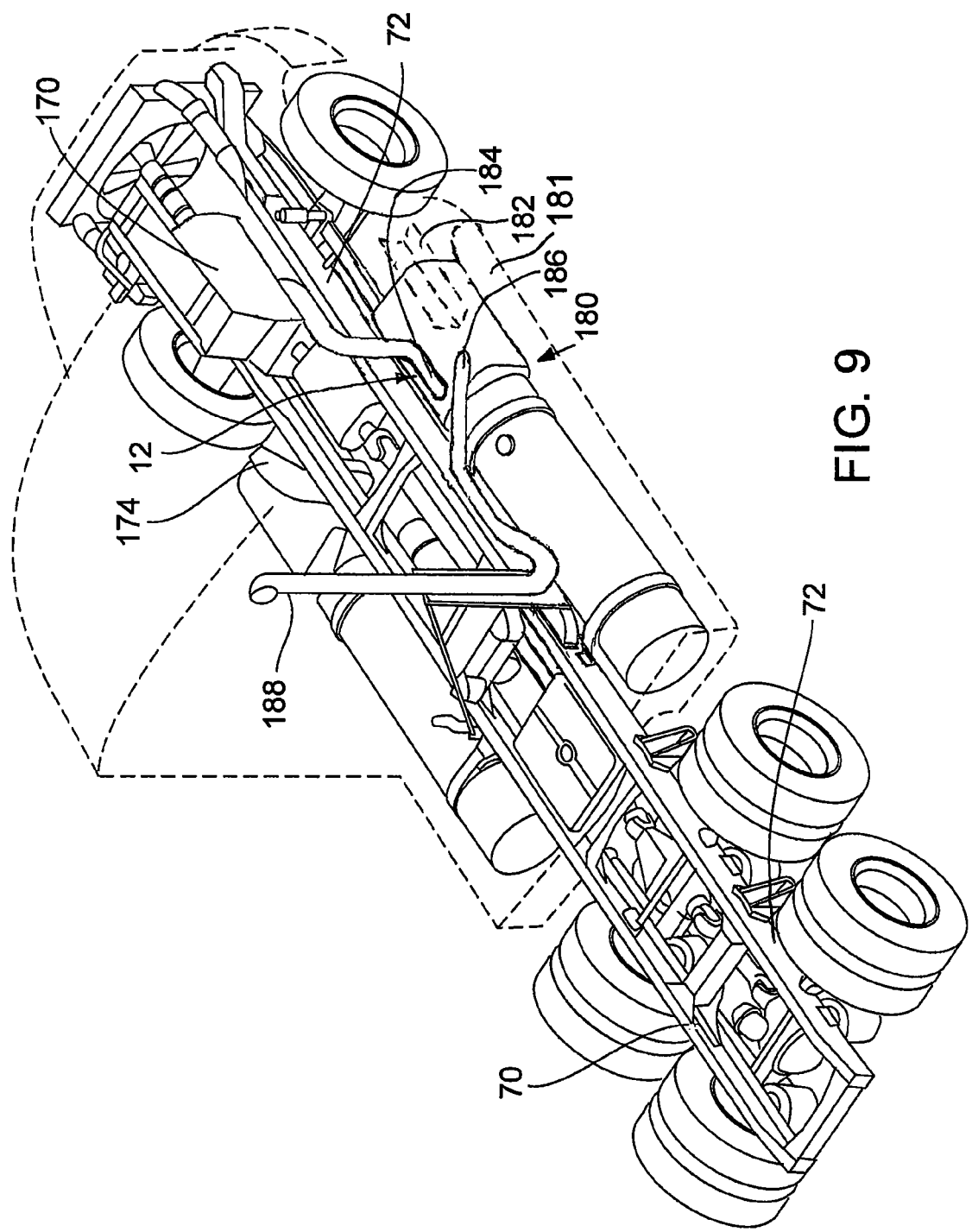
FIG. 9 illustrates an exhaust treatment apparatus or system in accordance with an embodiment located adjacent a door of a vehicle with steps included in or mounted to this embodiment for use in ingress or egress from the vehicle, the vehicle in this example comprising a heavy duty truck.
Figure 16:
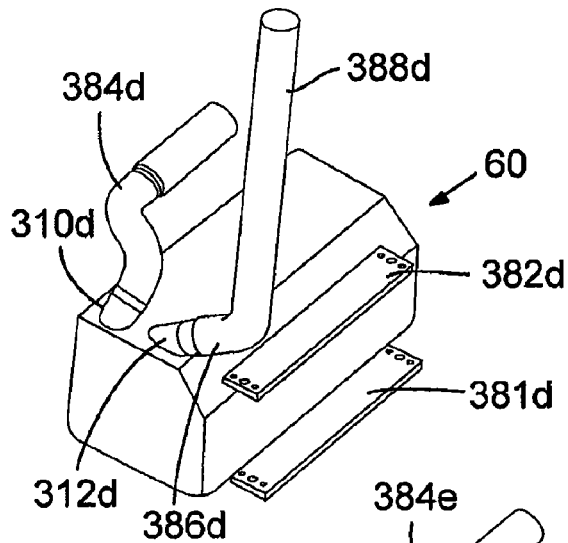
Figure 17:
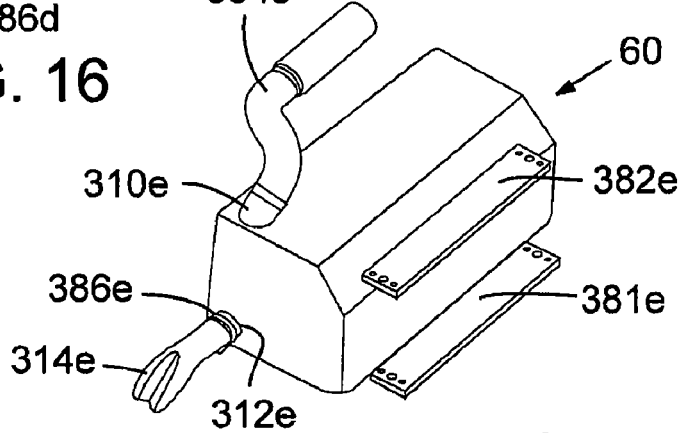
Figure 18:
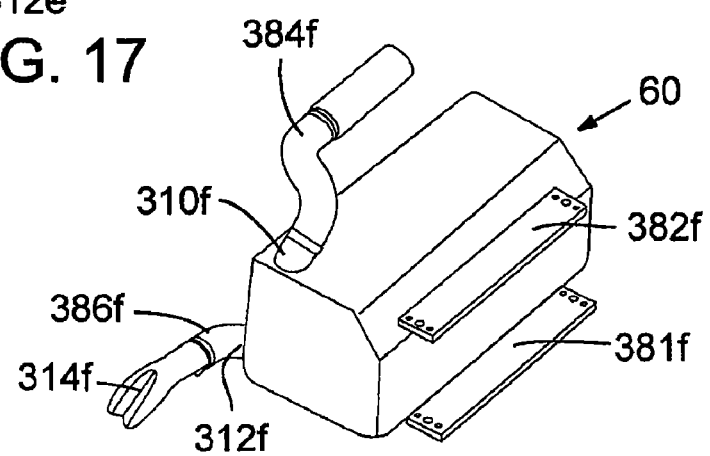

The disclosure proceeds with reference to a number of illustrative embodiments. These embodiments are not to be construed as limiting. The invention includes all novel and non-obvious method acts and features set forth herein, both alone and in combinations and subcombinations with one another.

With reference to FIG. 1, an exemplary embodiment of an exhaust treatment system 10 is illustrated and shown in schematic form. The illustrated system 10 is shown contained within a housing 12 comprising an exhaust inlet 14 and an exhaust outlet 60 with various exhaust processing or treatment components included in the system in an exhaust flow path between the inlet and outlet. As explained below, housing 12 can be comprised of a plurality of components that are assembled into or comprise the housing, which, when assembled, desirably comprises an integrated housing for all of the exhaust treatment components included in the system.

The exhaust gas treatment system 10 is suitable for treating exhaust gas from a diesel engine such as a truck engine. In an exemplary approach, exhaust gas, such as from a truck engine, is delivered via exhaust inlet conduit 14 to the interior of the housing. Within the housing, the exhaust gas stream can be separated into plural gas streams, such as bifurcated into two gas streams that travel along pathways or sections 18, 20 of a first portion of an exhaust gas flow path.

Exhaust gas passing along the pathway 20 enters an inlet to a first diesel particulate filter 22 and exits from an outlet of the filter 22 along a flow path 24. Gas flowing along path 18 enters an inlet of another diesel particulate filter 26 and passes from an outlet of this diesel particulate filter to a flow path 28. The gas streams along pathways 24 and 28 in this embodiment rejoin one another to flow along a common pathway 30 to a downstream portion of the exhaust gas treatment system. In the illustrated embodiment, the diesel particulate filters 22, 26 are in parallel with one another. Additional diesel particulate filters can be added to this system, desirably also in parallel with diesel particulate filters 22 and 26, if desired. However, the use of two diesel particulate filters 22 and 26 in parallel with one another has been found suitable for satisfactory removal of diesel particulates from a heavy duty diesel engine exhaust stream.

The term diesel particulate filter has been applied to components 22 and 26 because one of the primary functions of these components is to remove particulates from the exhaust stream. However, this does not preclude the inclusion of other exhaust treatment components therein or connected thereto. For example, in the embodiment of FIG. 1, diesel particulate filter 22 is shown subdivided into respective components 22A and 22B. Section 22A can comprise a diesel oxidation catalyst converter. A specific example of a diesel oxidation catalyst converter is a honeycombed cordierite ceramic material substrate coated with platinum and/or palladium as a catalyst, which can be included in cylinders or other housing subcomponents connected to or forming part of a housing for the diesel particulate filter. Diesel oxidation catalyst converters are commercially available with one specific example being available from Corning Incorporated. An example of one specific form of a diesel particulate filter, which does not preclude the use of alternative other forms of diesel particulate filters, is an aluminum titinate ceramic filter such as is also available from Corning Incorporated. The diesel particulate filter component of the filter 22 is indicated at 22B in FIG. 1. In addition, the filter 26 comprises respective diesel oxidation catalyst converter and diesel particulate filter components 26A, 26B.

A diesel particulate filter such as 22 and 26 can be quite compact, yet extremely efficient at removing particulates from the exhaust gas stream. For example, using diesel oxidation catalyst converters in housings that are ten and one-half inches in diameter and five inches long and diesel particulate filters in housings that are ten and one-half inches in diameter and ten inches long have proven to be over 90% efficient at removing soot (diesel particulates) from the exhaust gas stream of a heavy duty diesel truck engine. Thus, the overall assembled length of such an oxidation catalyst converter and diesel particulate filter is about fifteen inches. Although less desirable, more or fewer diesel particulate filters can be included in an exhaust gas treatment system in accordance with this disclosure. If more diesel particulate filters are included, desirably they can also be arranged in parallel with filters 22 and 26.

The exhaust flow path 30 communicates with an inlet 32 of a diesel exhaust fluid mixing chamber 34 wherein the filtered gases entering inlet 32 can be subjected to reduction or hydrolysis by injecting a reducing agent, such as ammonia or a solution of urea and water that forms ammonia within the mixing chamber, into the exhaust gas stream. The diesel exhaust fluid can be delivered from a tank or other storage unit 36 to nozzles or other delivery mechanisms at an injection or dispersion location 35 at the upstream end of the mixing chamber 34 in this example. In a conventional manner, supply and return lines communicate between the mixing chamber and the tank 36.

A common exemplary diesel exhaust fluid is a urea water mixture that contains about 32.5% urea by volume with a suitable urea being available as automotive grade urea. The dose of urea that is injected can be controlled depending upon the concentration of nitrous oxide in the exhaust downstream from the diesel particulate filters with sensors being used to sense the nitrous oxide levels. The exhaust mixed with the diesel exhaust fluid reaches an outlet 38 of the mixing chamber and flows from outlet 38 along an exhaust flow pathway 40 to inlets to one or more selective catalyst reduction converters. Exemplary catalyst reduction converters can comprise a ceramic material coated with chemicals that, together with the diesel exhaust fluid and heat of the exhaust, operate to convert nitrous oxide in the exhaust into nitrogen and water vapor, two harmless and natural components of the air we breathe. Exemplary catalyst substrates, such as ceramic materials, can include honeycombed cordierite ceramic such as described above having an iron zeolite catalyst coating. The iron zeolite catalyst coating, for example, is commercially available from Johnson Matthey Incorporated.

In the embodiment shown in FIG. 1, exhaust passing along flow path 40 is separated into a plurality of exhaust flow paths, such as bifurcated into two separate flow paths 42, 44. The gas flowing along pathway 42 reaches an inlet to a selective catalytic reduction converter (SCR) 46 and passes from SCR 46 to an outlet thereof and to a flow path 48. The gas flowing along flow path 44 enters an inlet to a second SCR 50 and exits from an outlet of SCR 50 to a flow path 52. The flow paths 48 and 52 in this example rejoin one another within the housing and exit from the housing at the exhaust outlet 60. Thus, in this example, the SCRs 46, 50 are in parallel with one another. One or more additional SCRs can be added, also desirably in parallel; if desired. However, a tandem set of SCRs has proven sufficient to reduce nitrous oxide to desired levels. As a specific example, the SCRs 46, 50 can each comprise two or more SCRs in series with one another. As a specific example, each of the SCR components of the overall SCR can be contained in a ten and one-half inch diameter cylindrical housing that is seven inches long. As a result, an exemplary SCR 46 is fourteen inches long by ten and one-half inches diameter, as is an exemplary SCR 50. With this construction, as well as the construction of the diesel particulate filters 22, 26, as described below, a compact housing can include these components and the diesel exhaust fluid mixing chamber.

The use of plural diesel particulate filters and plural SCRs increases the frontal (cross-sectional) area through which exhaust gas flows in contrast to a system having a single diesel particulate filter and single SCR of lesser total cross sectional surface area. This reduces back pressure through the exhaust treatment system and thereby contributes to increased fuel efficiency. For example, two diesel particulate filters that are ten and one-half inches in diameter have a total frontal area of about one hundred and seventy three square inches (as does two SCRs of the same diameter). Internal baffles can be used to substantially equalize the flow between the two parallel diesel particulate filters and the two parallel SCRs. Desirably, the flow can be equalized to be from about 49 percent to about 51 percent of the exhaust flowing through each of the components, when two diesel particulate filters and two SCRs are used (one in each of the parallel flow paths). For example, a flow reducing baffle can be included at the inlet or outlet of a diesel particulate filter that would otherwise have a higher exhaust flow to redirect the flow toward the other diesel particulate filter. The approach can also be used for an SCR that otherwise would have a higher exhaust flow. By equalizing the flow using internal flow direction baffles, the back pressure from the treatment system is reduced.

Back pressure is also reduced by having no more than three exhaust gas flow reversals in one desirable embodiment of a treatment system.

In a conventional manner, matting can be included inside tubing or other housings for the individual diesel particulate filters and SCRs that surround the substrates contained thereon. This matting assists in containing heat within these components to increase the temperature therein to increase their effectiveness. A housing wall for the system, such as wall 57 described below, such as of steel, can act as a heat shield and can also assist in maintaining a higher temperature within the system, while keeping exterior temperature within a desired maximum level (e.g., less than or equal to 230° Celsius). Temperatures within exhaust treatment components (diesel particulate filters, diesel exhaust fluid mixing chambers and SCRs) is also increased in by embodiments where these components are positioned immediately adjacent to one another (e.g., stacked with parallel SCRs, mixing chambers and particulate filters) in a common housing. As a result of the higher temperatures, conversion of NOx by the SCRs to nitrogen and water is more effective. The higher NOx conversion allows the engine to operate with greater thermal efficiency. Also, the higher NOx conversion in conjunction with the higher exhaust temperatures allows passive regeneration (burning of soot) in the diesel particulate filters to be more effective. This reduces the frequency of active regeneration (injecting and burning diesel fuel in the diesel particulate filters) to burn soot therein and thereby adds to the fuel efficiency of vehicles using the treatment system in comparison to systems where more frequent active filter regeneration is employed.

In addition, the inclusion of a hydrolysis chamber or pipe integrated into a common housing with the other components makes the system easily applicable to a variety of vehicle types. This also reduces the need for individualized design and independent emissions testing of systems with separated components.

The dosage of urea and frequency of active filter regeneration can be tuned to a particular engine to achieve the desired emission level for the engine.

In the embodiment of FIG. 1, the housing 12 is shown with a first end portion comprising an end wall 15 and a second end portion comprising an end wall 17, a top wall 19 and a bottom wall 21. For purposes of convenience in describing this embodiment, the length of the housing can be deemed to extend between the housing ends 15, 17. Thus, a first portion of the exhaust flow path, including the diesel particulate filters extends in a lengthwise direction from a location adjacent to end wall 15 to a location adjacent to end wall 17. In addition, in this embodiment the mixing chamber is oriented in a lengthwise direction relative to the housing with the inlet 32 being adjacent to end wall 17 and outlet 38 being adjacent to end wall 15. Also, the SCRs 46, 50 are located in respective first and second sections of a lengthwise extending third portion of the exhaust flow path with the inlets to the SCRs being adjacent to end wall 15 and the outlets of the SCRs being adjacent to end wall 17. Thus, this exemplary embodiment comprises a three pass exhaust gas treatment system with components in a common housing.

That is, exhaust flows generally in a first lengthwise direction within the housing in a first portion of an exhaust flow path, reverses direction and flows generally lengthwise through the housing in a second direction opposite to the first direction, and again reverses direction to flow generally lengthwise through the housing in a third direction opposite to the second direction between the respective exhaust inlets and exhaust outlets. It should be noted that the terms exhaust inlet and exhaust outlet are not limited to a single inlet or a single outlet. In addition, in this embodiment, a first portion of the exhaust flow path is bifurcated into two flow paths each containing a respective parallel diesel particulate filter and the third portion of the exhaust flow path is also bifurcated and contains respective parallel SCRs. In this description, the term "generally" with reference to the direction of a flow path does not preclude exhaust traveling in a variety of directions but instead refers to the overall direction of flow of at least the majority of exhaust gas in a direction from an inlet to a portion of the flow path to an outlet to a portion of the portion of the flow path.

With reference to FIGS. 2-4, an exemplary housing 12 is shown. In FIG. 2, an exemplary exhaust sensor junction housing 67 is shown containing sensors for sensing the level of nitrous oxide and other components in the exhaust gas stream at various locations in the exhaust treatment apparatus. Sensor housing 67 contains sensors that are used to control flow valves to adjust the levels of diesel exhaust fluid delivered to the mixing chamber. Any suitable controller responsive to the sensors can be used to control the flow valves.

The exemplary housing 12 comprises a central portion enclosed by a central lengthwise extending wall 57 that encloses this portion of the housing. The diesel particulate filter 22, 26, mixing chamber 34 and SCRs 46, 50 are positioned within the central portion of the housing in this exemplary embodiment. Housing end portions 59, 61 in the illustrated embodiment enclose transition portions or zones that direct exhaust from one exhaust flow portion to a downstream exhaust flow portion. End portions 59, 61 comprise transition portions which can be operable to cause the exhaust gas flow to change directions in the plural path system of this embodiment.

With reference to FIG. 4, the illustrated housing 12 comprises a lengthwise extending protrusion or projection 75 along an inner and lower portion of the housing. When the illustrated exhaust treatment system is installed, one or more brackets 69, or other mounting mechanisms, couple the housing 12 to a longitudinally extending frame rail 72 of the land vehicle with at least a portion of the frame rail being positioned in a notch or void area of housing 63 above the protrusion 75. In addition, in this example the lower projecting portion 75 of the housing extends underneath at least a portion of the frame rail 72 and, as can be understood from the description below, desirably contains at least a portion of one of the exhaust treatment components, such as an SCR. Thus, the illustrated housing 12 is provided with an upper frame rail receiving void and lower projection along one side of the housing. In FIG. 4, a diesel fluid injection location 35 is shown where diesel exhaust fluid (e.g., urea) inlet and outlet lines 37, 39 terminate at the exterior of the housing, in one specific example of a housing construction. Other housing components shown in FIGS. 2-4 that are in common with components indicated schematically in FIG. 1 have been assigned the same numbers for convenience and will not be explained in detail.

FIGS. 5-8 further illustrate an exemplary embodiment of an exhaust gas treatment apparatus 10. Again, components in common in these figures with components of FIGS. 1-4 have been assigned the same numbers and will not be discussed in detail. With reference to FIG. 5, the illustrated mixing chamber 34 has a generally an oval cross-section and (as best seen in FIG. 8) is oriented in a side-by-side relationship to the SCRs 46, 50, in this example.

With reference to FIG. 6, exhaust entering inlet 14 is shown flowing along flow path branches 18, 20 through the respective diesel particulate filters 22, 26. The exhaust from inlet 14 passes through a transition portion, such as a chamber 86 of end portion 59 (FIG. 8) that acts as a header to distribute the exhaust to the diesel particulate filter inlets. As can be seen in FIG. 7, the first transition portion comprises an internal chamber 86 within end portion 59 of the housing, with a wall 88 of this chamber being shown in FIG. 7. Chamber 86 communicates with inlet 14 and with the respective inlets to the diesel particulate filters. Exhaust entering chamber 86 is contained within this chamber and is delivered to the respective inlets to the diesel particulate filters. Thus, a common chamber collects the entering exhaust and delivers it simultaneously to both of the diesel particulate filters in embodiments where two diesel particulate filters are used. Separate conduits leading to respective inlets of the diesel particulate filters can also be used as a less desirable alternative. The exhaust exiting from the diesel particulate filters flows into another transition chamber or zone 80 at the outlets of the particulate filters. The illustrated transition chamber 80 is within the end portion 61 of the housing. An end wall 82 of chamber 80 is shown in both FIGS. 6 and 8. Chamber 80 directs the exhaust flow from diesel particulate filters 22, 26 to flow path 30 and into the inlet of the mixing chamber 34. A common chamber 80 operable as a header for collecting and combining the exhaust gas from both diesel particulate filters is a desirable embodiment for combining the filtered exhaust gas into a single stream for delivery to a mixing chamber. However, separate conduits connected to the respective particulate filter outlets and to one or more inlets to the mixing chamber can be used.

As best seen in FIG. 7, exhaust from the mixing chamber 34 enters a transition portion, such as a chamber 90, that communicates with the inlets to the respective SCRs 46, 50. A common chamber 90 directs the exhaust from the mixing chamber to reverse direction and flow through the respective SCRs. Again, separate conduits can be used for this purpose, although this is less desirable than a common chamber 90. End wall 15 of the housing comprises the end wall of the chamber 90 in this example. An interior wall 92 bounds the interior of chamber 90 as well as the interior of chamber 86 with openings being provided through wall 92 for the respective SCRs, mixing chamber and diesel particulate filters. An interior wall 94 is provided with openings 96, 98 therethrough communicating with the outlets of the diesel particulate filters. In FIG. 7, the wall 82 bounding the chamber 80 can also be seen. Chamber 90 thus, in this example, comprises one example of a third transition zone or portion for redirecting the direction of flow of exhaust gas entering the chamber 90 from the mixing chamber 34. Exhaust gas exiting the SCRs enter a chamber 100 with the entering exhaust gas being directed through chamber 100 to the exhaust outlet 60. Wall 94 has openings therethrough for passage of the outlets from the SCRs to the chamber 100. Again, separate conduits can be utilized to direct the exhaust flow from the SCRs to the exhaust outlets, although this would be less desirable. The chamber 100 thus comprises an example of a fourth transition portion operable to direct exhaust gas from SCR outlets to the exhaust outlet. In the above embodiment, exhaust entering the chamber 86 is separated by chamber 86 from exhaust entering chamber 90 from the mixing chamber 34. In addition, exhaust from the diesel particulate filters entering chamber 80 is separated by this chamber from exhaust entering chamber 100 from the SCR outlets.

FIG. 9 illustrates a truck comprising a diesel engine 170, first and second spaced apart frame rails, 70, 72, which are generally elongated and extend in a longitudinal direction from a fore or front location to an aft or rear location of the truck. Frame rails 70, 72 can be parallel to one another and can extend in a direction of the longitudinal axis of the truck. A housing 12 for an exhaust treatment system, such as described above, is coupled, as by mounting brackets (not shown) to the frame rail 72 and is positioned along the side of the frame rail and outside of the space between the frame rails 70, 72 in this example. In the illustrated embodiment of FIG. 9, the housing 12 is positioned for the most part outside of a plane containing the outermost surface of the frame rail 72. That is, in this example, only a portion of the housing (e.g., the portion 75 in the FIG. 4 example) extends beneath the frame rail 72. A fairing 180 can overlay the exterior surface of the housing 12. First and second steps 181, 182 can be provided in the fairing (or coupled to the fairing). In the example of FIG. 9, the housing 12 is positioned beneath the door of a cab of a vehicle and can be positioned at least partially beneath the steps. An exhaust inlet 184 from engine 170 is coupled to an inlet port to the housing 12. Exhaust entering the housing passes through at least one particulate filter, a diesel exhaust fluid mixing section or chamber, and at least one selective catalyst reduction converter to an outlet. The outlet in this example is coupled to an exhaust conduit 186 and to an upwardly extending exhaust pipe 188. In an alternative construction, the steps 181, 182 can be mounted, such as by mounting brackets, to the housing 12. Also, the steps can comprise mounting brackets for connection to housing mounted brackets with the step brackets and housing brackets being interconnected to mount the steps in place. The housing 12 can be positioned at either side of the vehicle, such as substantially outside of the frame rail 70 instead of substantially outside of the frame rail 72 as shown in FIG. 9. The FIG. 9 positioning is a desirable example. The urea or other diesel exhaust fluid and fuel tanks can be positioned, for example, rearwardly of the housing 12.

In the embodiment of FIGS. 10 and 11, the housing 12 containing components of an exhaust treatment system, such as described above, is mounted at a mid-chassis location. By mid-chassis, it is meant a location rearwardly of the door of the vehicle and intermediate to the front and rear ends of the vehicle. In this example, a truck 202 is illustrated comprising a cab 289 with a door 285. A fairing 204 supports steps 281 and 282. A second fairing section 200 is also shown. Exhaust from a diesel engine 270 is delivered via conduit 284 to an inlet port 14 of the housing 12. The exhaust passes through the treatment components within the housing to an exhaust port 60 and an exhaust conduit 286. From exhaust conduit 286, the now treated exhaust exits via an upright exhaust stack or pipe 288. The housing 12 in this example is coupled to frame rail 72 at a location substantially outside of the frame rail. Alternatively, the housing can be positioned at the opposite side of the vehicle 202 and coupled to a frame rail at that side of the vehicle.

FIGS. 12-14 illustrate alternative configurations for housing 12 to show alternative locations for exhaust inlet ports and outlet ports to and from the housing with exemplary exhaust pipe routings that can be used in understep or mid-chassis installations. Exhaust treatment components are included within the housing and arranged to process exhaust gas through one or more diesel particulate filters, a mixing chamber and one or more SCRs between the inlet and outlet of the housing.

FIGS. 15-18 are examples of alternative understep configurations of exhaust treatment system housings, although steps are not shown in the FIG. 15 embodiment. In these figures, the same numbers have been used for corresponding components of these figures together with different letter designations associated with respective different embodiments. Thus, no letter designation is assigned to components in FIG. 12, the letter "a" is assigned to components in FIG. 13, the letter "b" is assigned to components in FIG. 14, the letter "c" is assigned to components in FIG. 15, the letter "d" is assigned to components in FIG. 16, the letter "e" is assigned to components in FIG. 17, and the letter "f" is assigned to components in FIG. 18. Because of this common numbering, only the embodiment of FIG. 12 will be described in detail. In FIG. 12, the exhaust inlet port is indicated by the number 310 (corresponding to exhaust inlet 14 in the FIG. 1 embodiment). In addition, the exhaust outlet port is designated by the number 312 (corresponding to the exhaust outlet 60 in FIG. 1). An exhaust conduit 384 delivers exhaust from an engine or turbocharger thereof to inlet 310. Outlet 312 is coupled to a conduit 386 that carries the exhaust to a downstream dispersion mechanism such as an upright stack 388, shown in FIG. 12, or an exhaust gas disperser such as shown at 314b in FIG. 14. Exemplary embodiments of an exhaust dispersion apparatus 314b are described in U.S. patent application Ser. No. 11/542,365, filed on May 26, 2006 (Publication No. US2007/0039318 A1) and in U.S. patent application Ser. No. 11/981,245 (Publication No. US 2008/0099276 A1), filed on Nov. 11, 2006. The use of a specific form of dispersion apparatus is not part of the present invention and is simply provided for illustrative purposes. Steps are indicated schematically at 381d and 382d in FIG. 16.

Figure 19A:
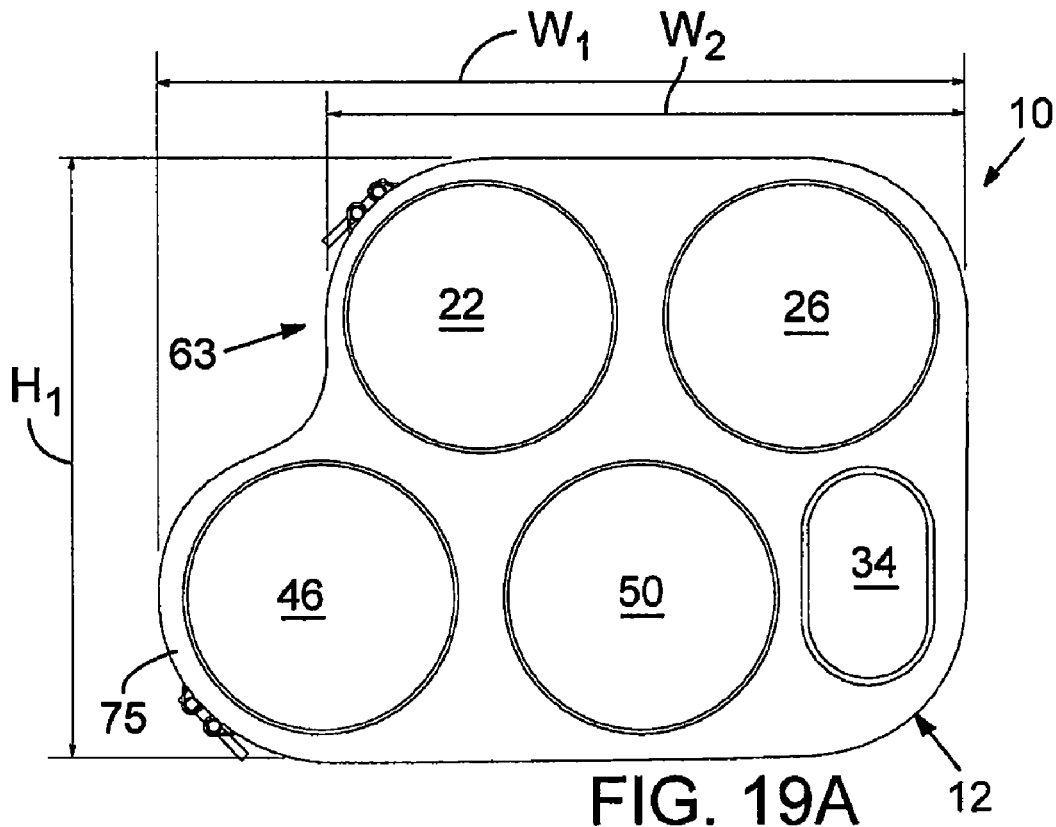
FIGS. 19A-19D illustrate various embodiments of exhaust treatment systems showing exemplary alternative locations of components within a housing for treating exhaust which result in a compact exhaust treatment system.

FIG. 19A schematically shows a vertical section through an exemplary housing 12, such as can be used in the example discussed above in connections with FIGS. 2-8. In FIG. 19A, the diesel particulate filters 22, 26; SCRs 46, 50; and mixing chamber 34 are shown in the same relative position as in the FIGS. 2-8 embodiments. The housing 12 can be an extremely compact housing despite the fact the exhaust gas treatment system is contained therein is treating a significant volume of diesel exhaust. As one specific example, the overall height of the housing, designated $H_1$ in FIG. 19A can be about 543.5 mm; the overall width $W_1$ of the housing can be about 727 mm, and the narrow width $W_2$ accounting for the notched out area 63 above projection 75 can be about 583.9 mm. In addition, the overall length of the housing 12, including the end portions thereof, can be about 760.2 mm. These dimensions are exemplary only and can be varied. These exemplary dimensions illustrate the compact nature that can be achieved in embodiments of the exhaust gas treatment apparatus in accordance with this disclosure.

Figure 19B:
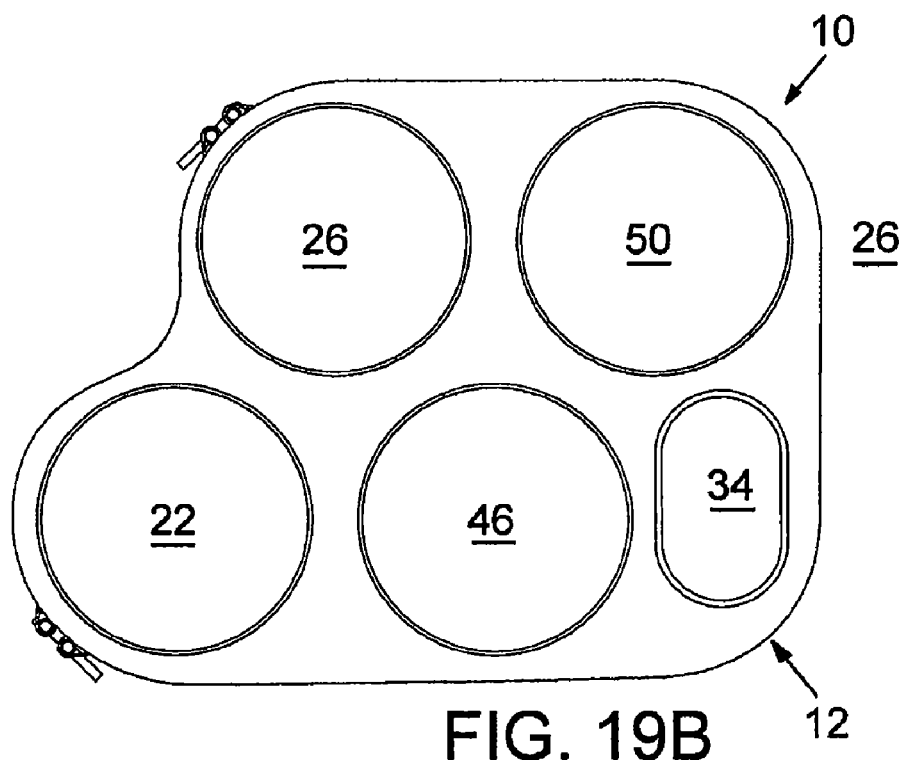
Figure 19C:
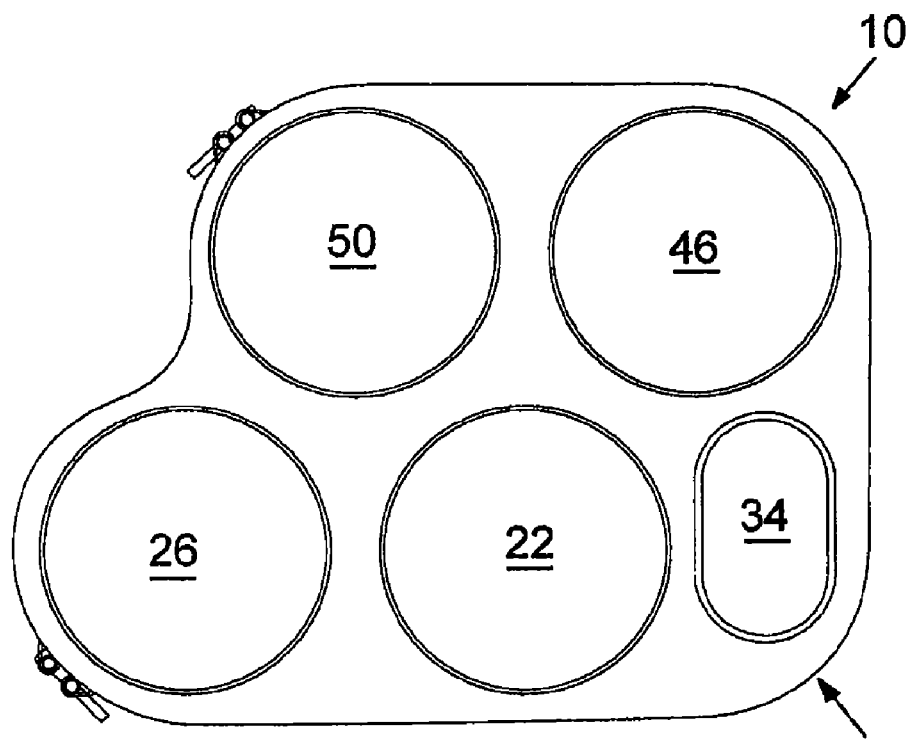
Figure 19D:
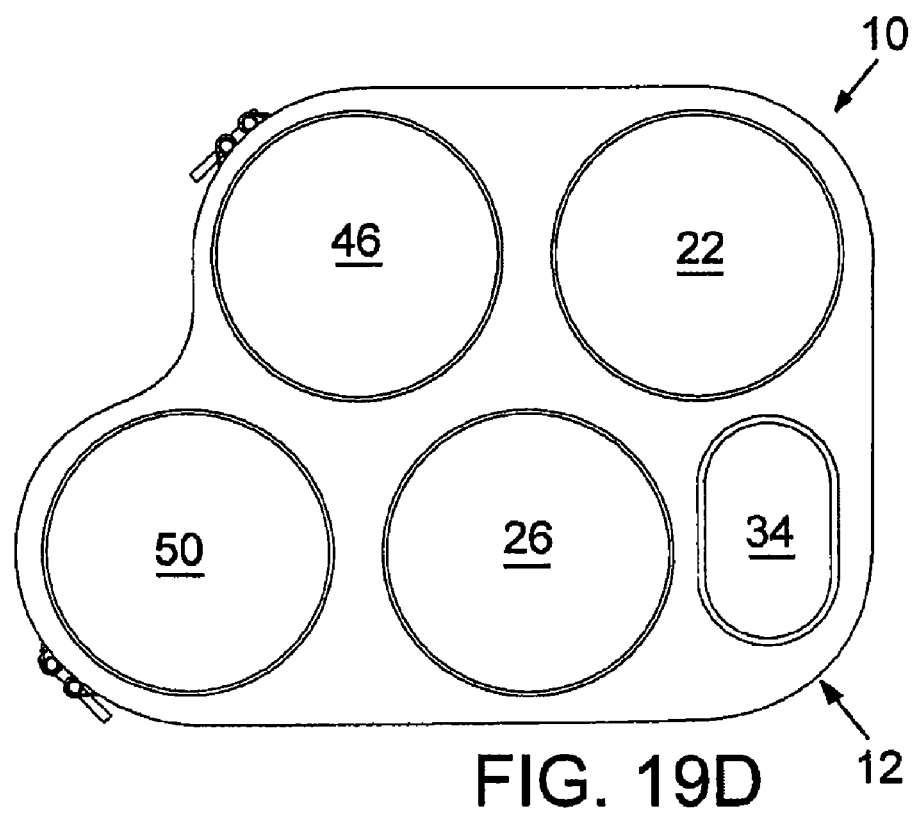

FIGS. 19B, 19C and 19D illustrate alternative positionings of the diesel particulate filters and SCRs from the positioning shown in FIG. 19A. It should be noted that the mixing chamber can also be located at other locations (e.g., between SCRs 46, 50; outside of SCR 46; and above the SCRs, for example). The transition chambers or zones would be adjusted with changes in the location of the various components to redirect exhaust between upstream and downstream components as described previously.

FIGS. 20-32 illustrate an embodiment of a diesel exhaust treatment system comprising at least one diesel exhaust filter, and more desirably two such filters, a diesel exhaust fluid mixing chamber, and at least one SCR, and more desirably two such SCRs. These various components can be arranged in a manner described above in connection with the FIGS. 2-8 embodiment, although in the embodiment shown in FIG. 20, the mixing chamber 34 is desirably positioned at an upper portion of the housing instead of at an alternative lower location indicated at 34' in FIG. 20. Components in common with the embodiments previously discussed have been assigned the same numbers in these figures and will not be discussed in detail.

Figure 20:
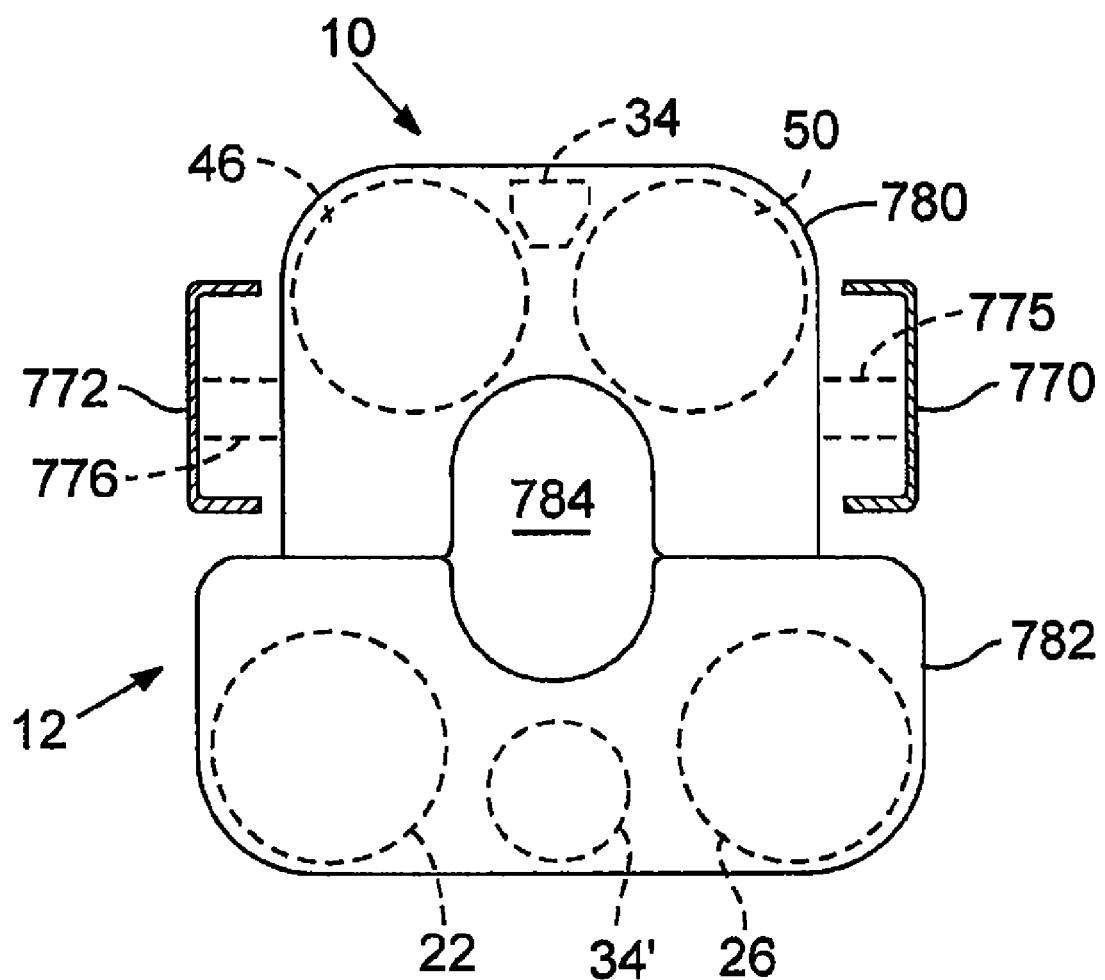
FIG. 20 illustrates an exemplary embodiment comprising a housing, which can include plural housing sections, which defines a lengthwise extending passageway therethrough to accommodate the drive shaft of a vehicle when the housing is coupled to respective frame rails of the vehicle, and with a portion of the housing being positioned between the frame rails.

In the embodiments of FIGS. 20-32, the housing includes a drive shaft passageway extending through the housing to accommodate a drive shaft of a vehicle passing through the drive shaft passageway when the housing is coupled to the frame rails (indicated at 770 and 772 in FIG. 20) of the vehicle. The housing 12 can be designed for coupling to the frame rails at a location that positions at least a portion of the housing between the frame rails. Brackets, such as 775 and 776 can be used to connect the housing to the respective frame rails. Alternatively, as discussed below, other attachment approaches can be used. For example, cross members can be provided at respective ends of the housing and coupled thereto with the cross member ends being mounted or coupled to the respective frame rails and with the cross members extending therebetween. In FIG. 20, an exemplary drive shaft passageway 784 is shown. In addition, housing 12 in this example comprises upper and lower housing sections 780, 782 with each of the housing sections defining a portion of the illustrated drive shaft passageway in this example.

Figure 21:
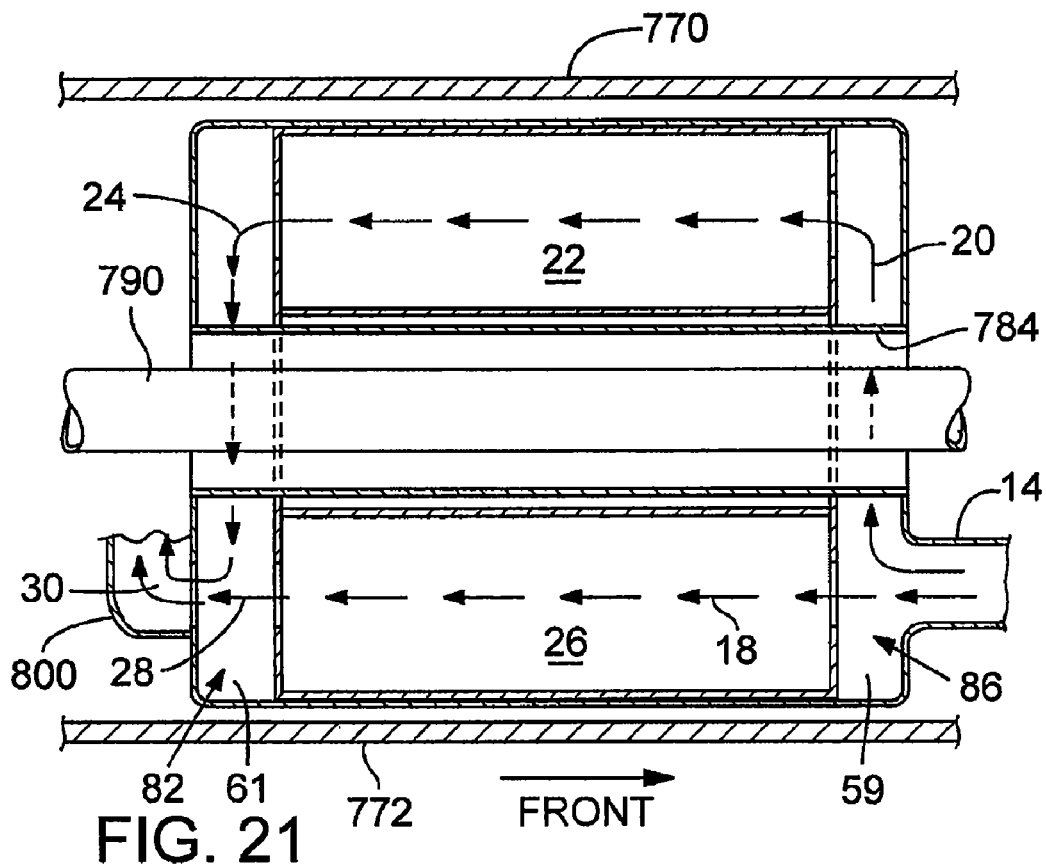
FIGS. 21 and 22 illustrate exemplary exhaust flow paths through an embodiment similar to the embodiment of FIG. 20.
Figure 22:
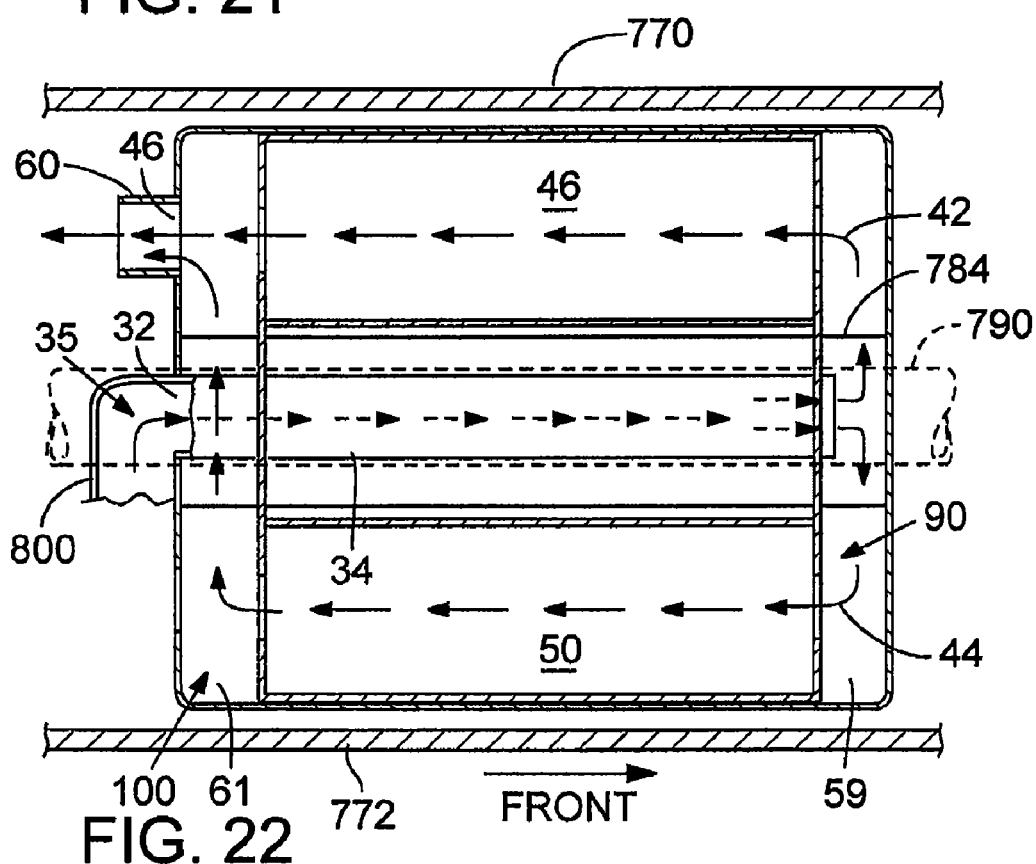
Figure 23:
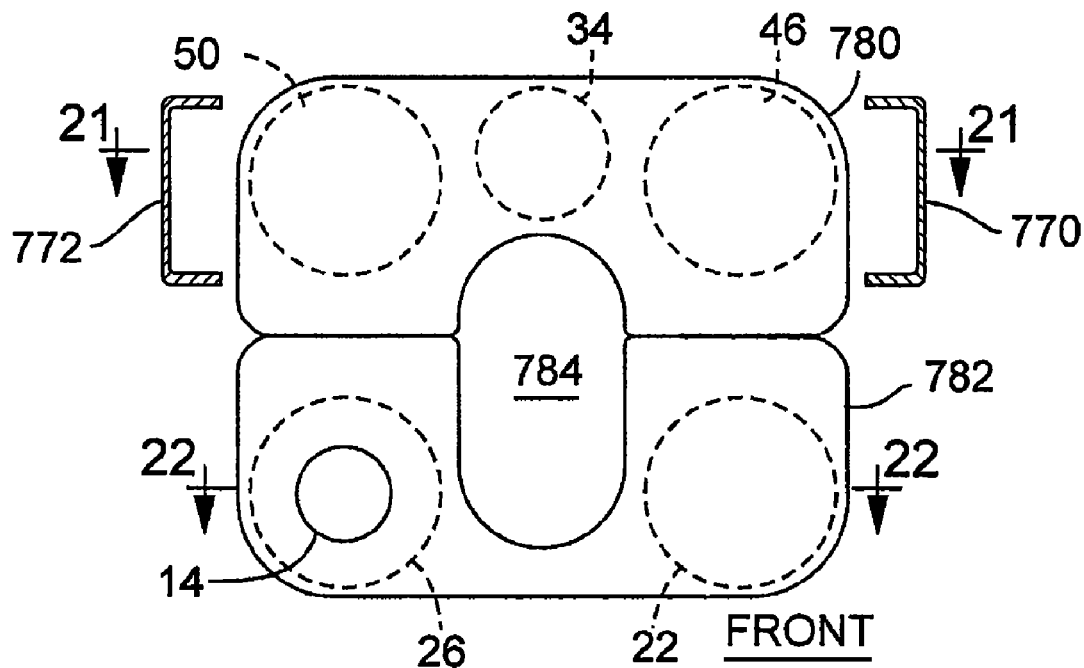
FIGS. 23 and 24 are respective front and rear end views of an embodiment similar to the embodiment in accordance with FIG. 20.
Figure 24:
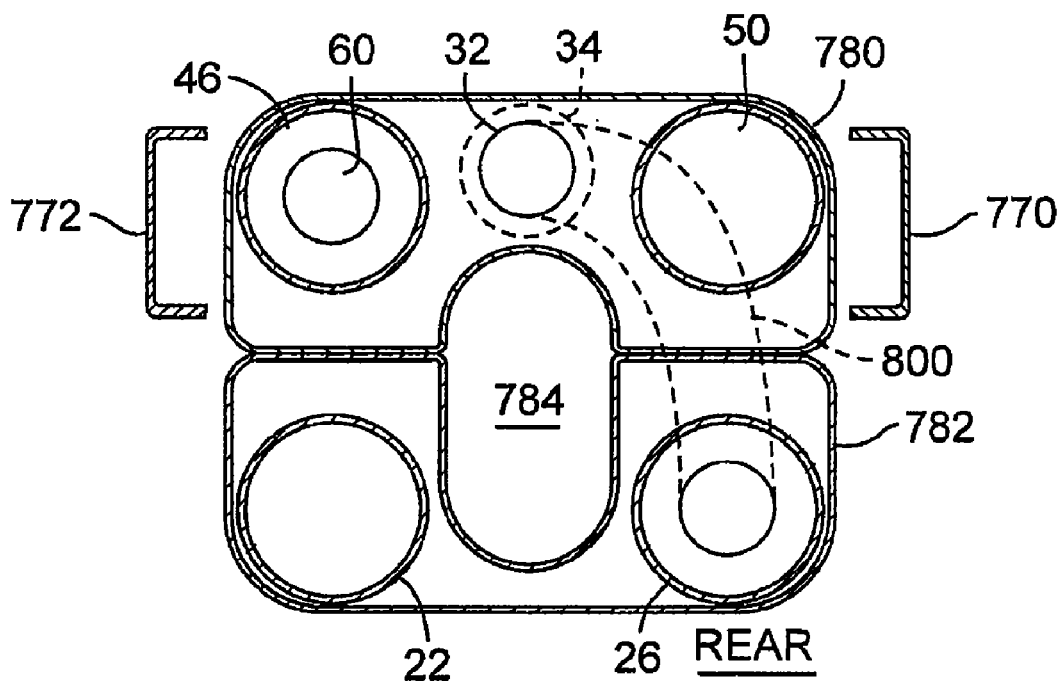

FIGS. 21 and 22 schematically illustrate the embodiment of FIG. 20 and includes the drive shaft 790 shown therein. FIG. 21 schematically shows a lower portion of the apparatus with parallel diesel particulate filters 22, 26 shown in this lower portion together with a flow path from the exhaust inlet 14 into the respective diesel particulate filters. The transition portion 86 (FIG. 21) at the diesel particulate filter inlets, transition portion 82 at the diesel particulate filter outlets, in this example coupled by a conduit 800 to an inlet 32 (FIG. 22) to the mixing chamber 34, the transition portion 90 (FIG. 22) coupling the outlet of the mixing chamber to the respective SCRs 46, 50, and the transition portion 100 coupling the outlets of the SCRs to the exhaust outlet 60 are all shown in these figures. These transition portions can comprise respective headers or chambers. FIGS. 23 and 24 illustrate end views of the embodiments of FIGS. 21 and 22 with internal components therein shown in dashed lines. In the embodiments of FIGS. 21-24, the upper and lower housing sections 780, 782 are of the same length.

Figure 27:
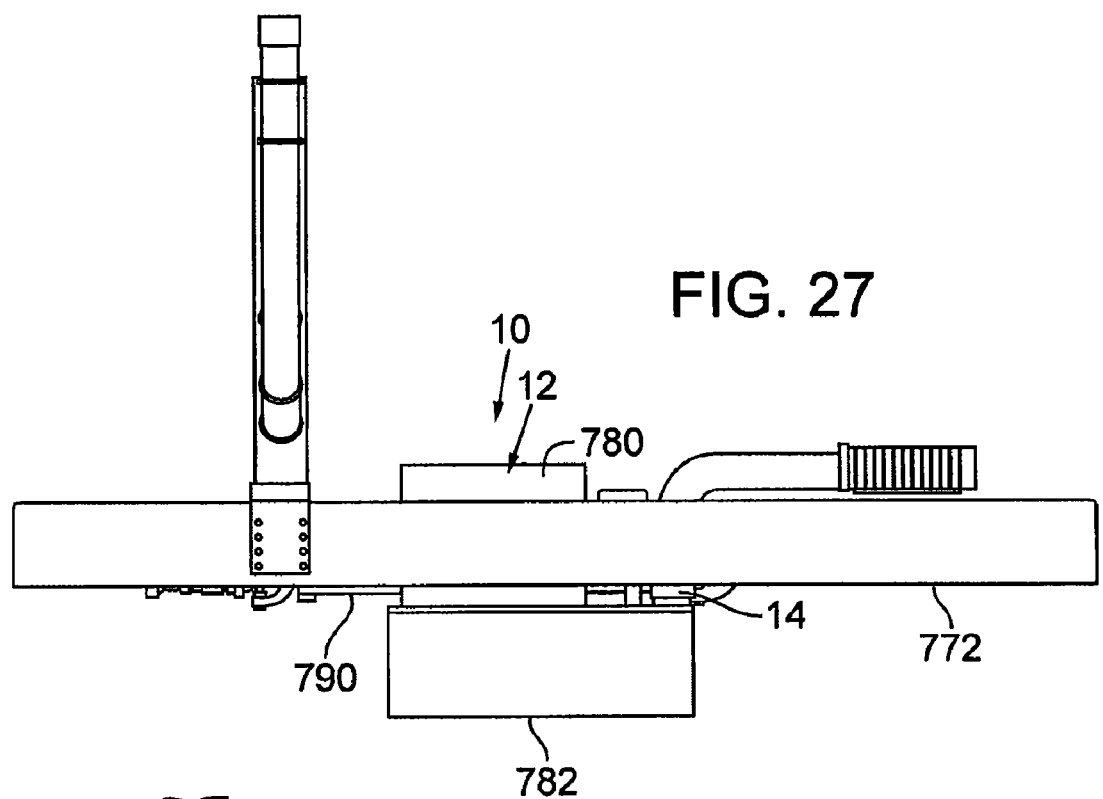
FIG. 27 is a side elevational view of the embodiment of FIGS. 25 and 26.
Figure 28:
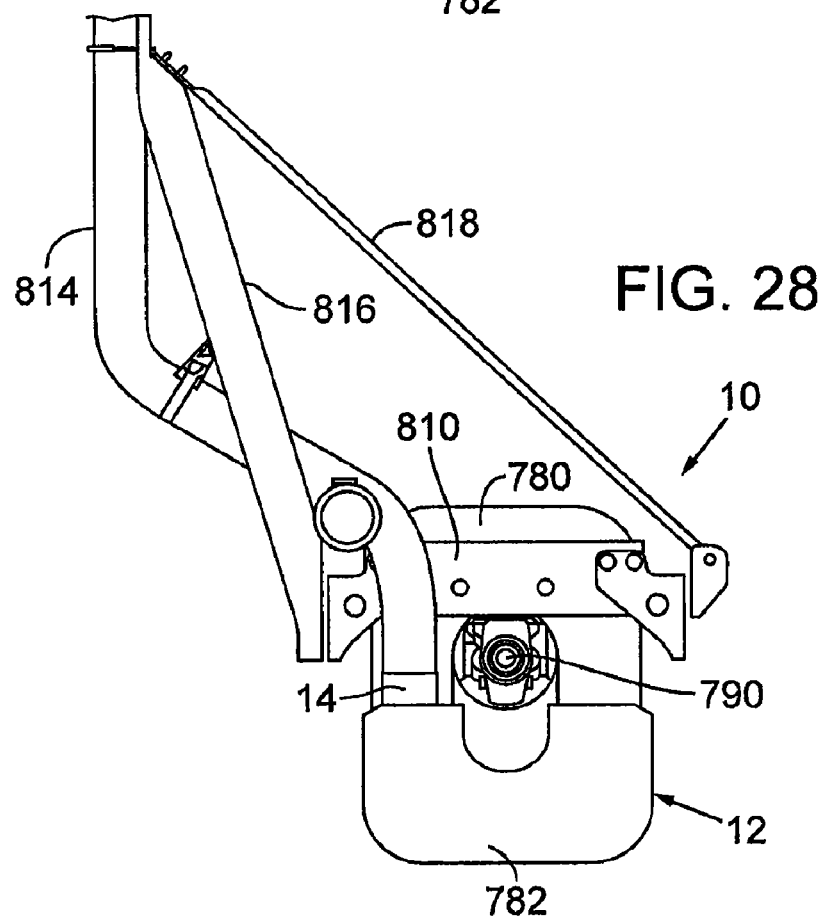
FIG. 28 is a front view of the embodiment of FIGS. 25 and 26.

FIGS. 25 and 26 further illustrate embodiments of this form of exhaust treatment system with some modifications. In the embodiments of FIGS. 25 and 26, respective front and rear cross-members 810, 812, extending between the frame rails, are shown. Mounting brackets at the ends of these cross-members secure the cross-members to the respective frame rails 770, 772. The housing sections can be coupled to these cross members. In the embodiments of FIGS. 25 and 26, the upper portion of the housing 780 is shorter than the lower portion of housing 782 to accommodate other components on the vehicle. For example, by shortening the upper housing section, a battery box or other vehicle component can be placed in the area above the lower housing section where no upper housing section is present. FIG. 27 is a side elevational view of the embodiment of FIG. 25 that is provided to further illustrate this embodiment. Desirably the upper and lower housing sections 780, 782 are interconnected, such as by clamps or other fasteners. However, these housing sections can be separately mounted, such as to the frame rails without any interconnection being provided between the housing sections other than conduits that carry exhaust gas between exhaust treating components in the housing portions, although this is less desirable. FIG. 28 illustrates an end view of the embodiment of FIG. 27 again to further illustrate an exemplary construction. In addition, exemplary mounting braces are shown for an exhaust stack 814, the braces being indicated at 816, 818 in FIG. 28.

Figure 29:
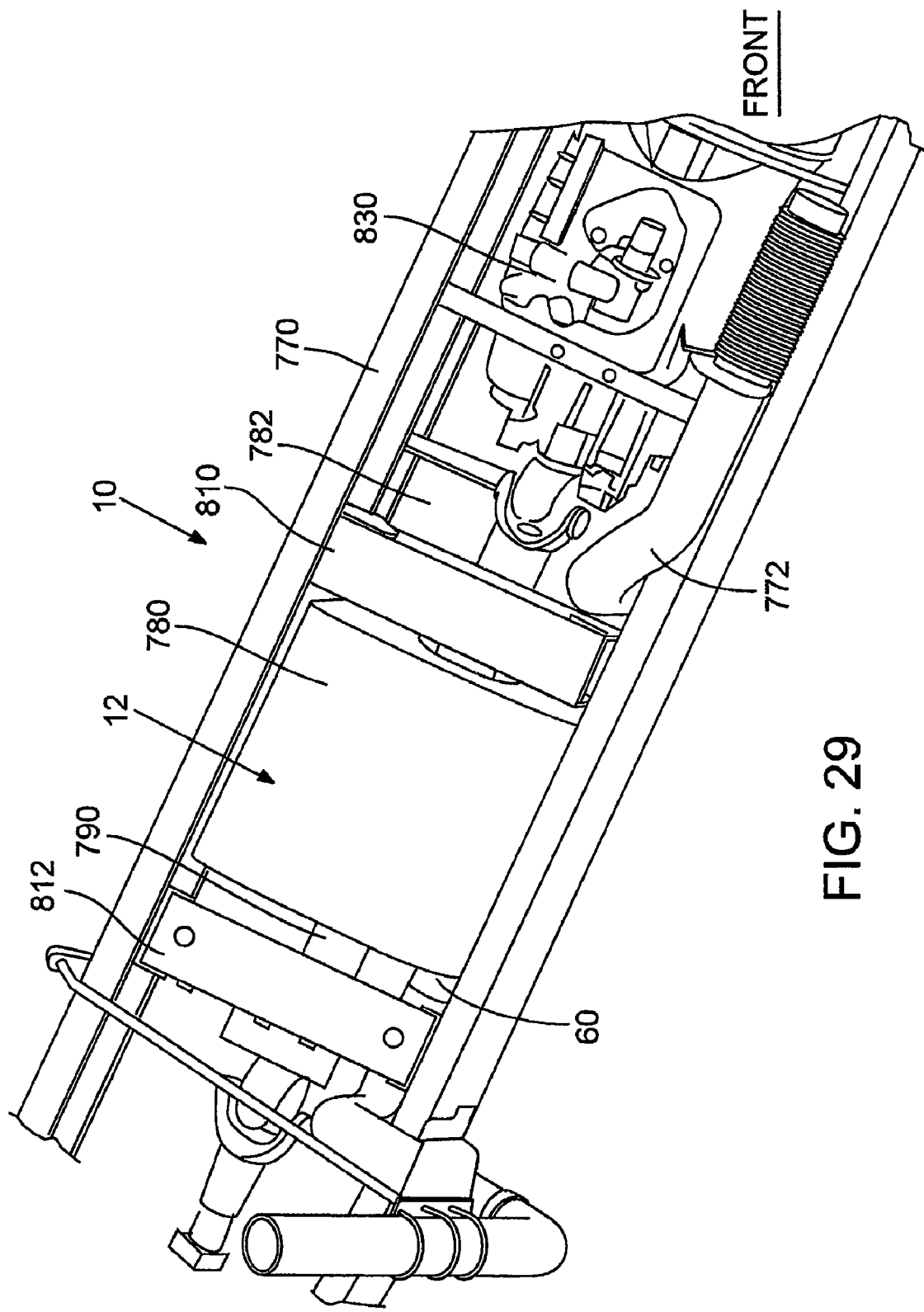
FIG. 29 is an isometric view of the embodiment of FIG. 25, with additional vehicle components shown therein.

FIG. 29 is similar to FIG. 26, but also illustrates a transmission 830 of the vehicle.

Figure 30:
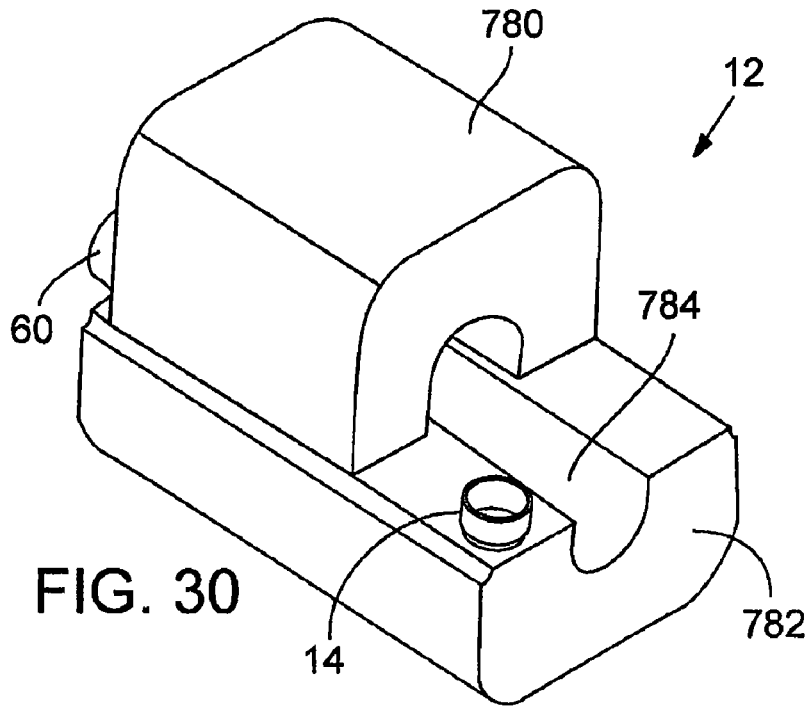
FIGS. 30 and 31 are respective isometric views of an exemplary housing that can be used in the embodiments of FIGS. 25 and 26, looking respectively toward respective first and second end portions of the housing.
Figure 31:
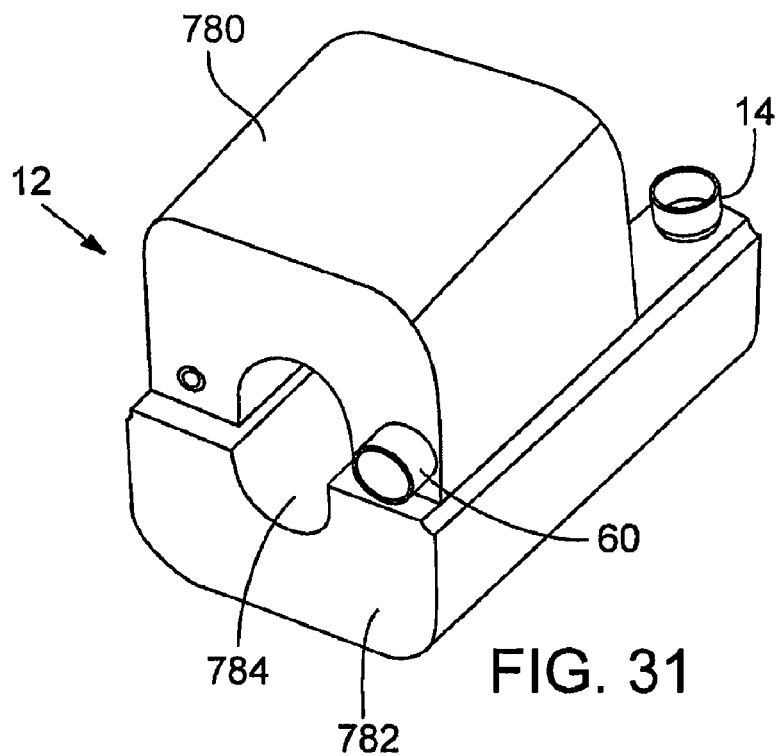

FIGS. 30 and 31 provide additional views of the exemplary housing 12 comprising upper and lower housing portions with the drive shaft accommodating passage 784 being shown in these figures.

Figure 32:
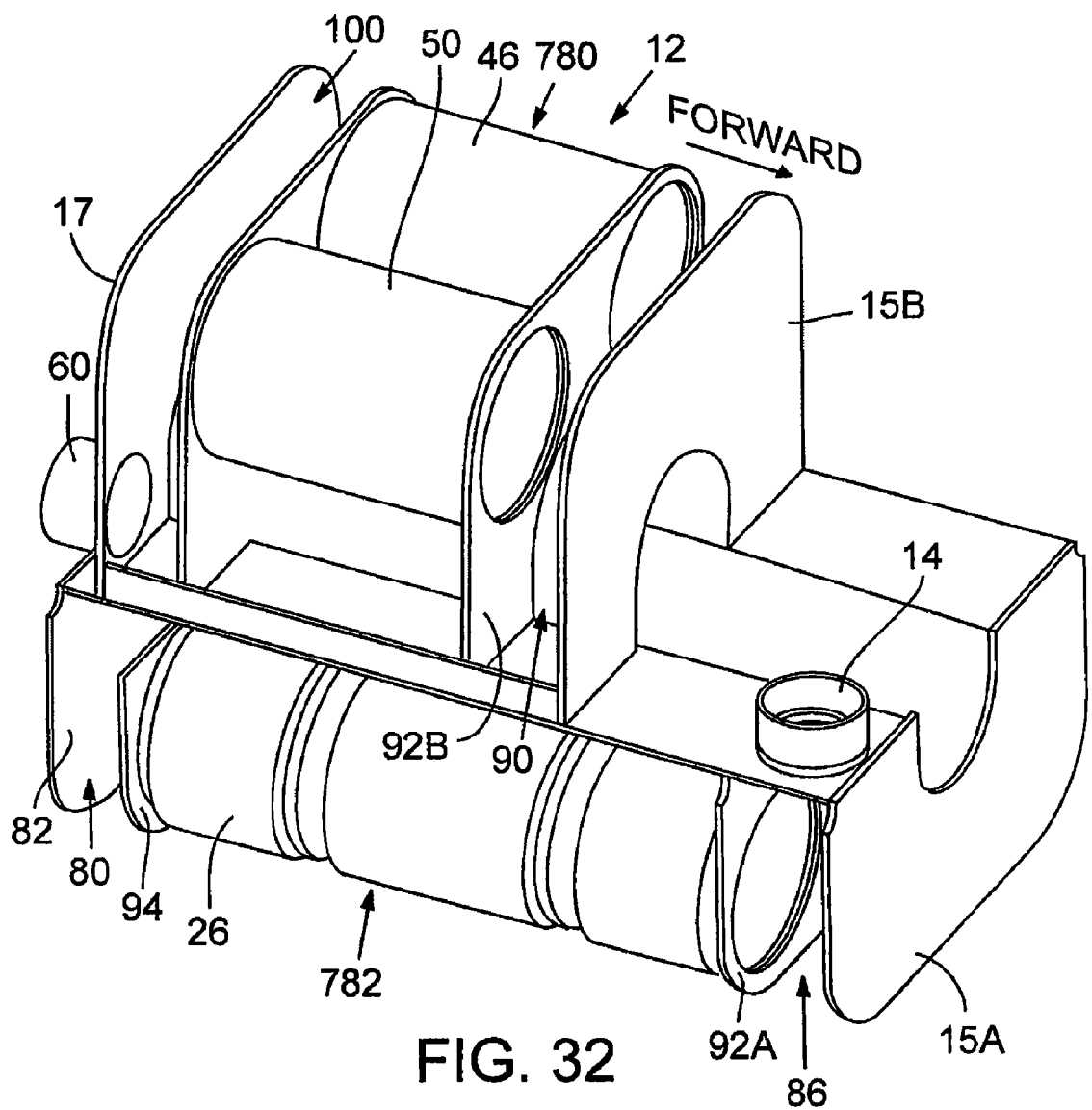
FIG. 32 is a partially broken away view of the housing of FIGS. 30 and 31 illustrating an exemplary arrangement of exhaust treatment components therein.

FIG. 32 illustrates an embodiment corresponding to FIGS. 30 and 31 with the outer wall or shell of the housing portions 780, 782 removed. In this figure, end wall 15 is shown as wall sections 15A and 15B at the respective ends of the lower and upper housing portions with these wall sections being offset from one another. In addition, wall 92 in FIGS. 2-8 is shown as two separate offset wall sections 92A and 92B in FIG. 32. In FIG. 32, the various internal chambers and transition portions are shown (transition portion 86 at the inlet to the diesel particulate filters, 80 at the outlet of the diesel particulate filters, 90 at the inlet to the SCRs and 100 at the outlet from the SCRs to the exhaust outlet 60).

Having illustrated and described the principles of our invention with reference to a number of embodiments, it should be apparent to those of ordinary skill in the art that these embodiments may be modified in arrangement and detail without departing from the inventive principles disclosed herein. We claim as our inventions all such modifications as fall within the scope of the following claims.

We claim:

1. An exhaust gas treatment system for treating exhaust gases from a diesel engine of a land vehicle, the land vehicle comprising first and second elongated vehicle frame rails that extend in a lengthwise direction of the vehicle, the exhaust gas treatment system comprising:
   a housing coupled to at least one of the frame rails and comprising an exhaust gas inlet and an exhaust gas outlet, the housing comprising a lengthwise extending protrusion positioned at least partially beneath said one of the frame rails, the housing comprising a void area above the protrusion with at least a portion of said one of the frame rails being positioned in the void area above the protrusion;
   first and second diesel particulate filters within the housing, each diesel particulate filter comprising a diesel particulate filter inlet coupled to the exhaust gas inlet and a diesel particulate filter outlet;
   a diesel exhaust fluid mixing chamber within the housing, the mixing chamber comprising a mixing chamber inlet coupled to each of the diesel particulate filter outlets and a mixing chamber outlet; and
   first and second selective catalytic reduction (SCR) converters within the housing, each SCR converter comprising an SCR inlet coupled to the mixing chamber outlet and an SCR outlet coupled to the exhaust gas outlet.

2. An exhaust gas treatment system according to claim 1 wherein the housing has a length and comprises first and second end portions and wherein the diesel particulate filters, SCR converters and diesel exhaust fluid mixing chamber each extend in a lengthwise direction relative to the housing from a first end portion of the housing a second end portion of the housing.

3. An exhaust gas treatment system according to claim 1, wherein the housing has a length and comprising mounting brackets for coupling the housing to at least one of the frame rails with the length of housing being oriented in the lengthwise direction.

4. An exhaust gas treatment system according to claim 1 wherein the housing comprises plural housing components.

5. An exhaust gas treatment system according to claim 1 wherein the first and second SCR converters are elongated and extend from a first end portion of the housing toward a second end portion of the housing, the first and second diesel particulate filters are elongated and extend from the first end portion of the housing toward the second end portion of the housing, and wherein the first and second SCR converters overlap the first and second diesel particulate filters along the entire length of the SCR converters.

6. An exhaust gas treatment system for treating exhaust gases from a diesel engine of a land vehicle, the land vehicle comprising first and second elongated vehicle frame rails that extend in a lengthwise direction of the vehicle, the exhaust gas treatment system comprising:
a housing for coupling to at least one of the frame rails and comprising an exhaust gas inlet and an exhaust gas outlet;
first and second diesel particulate filters within the housing, each diesel particulate filter comprising a diesel particulate filter inlet coupled to the exhaust gas inlet and a diesel particulate filter outlet;
a diesel exhaust fluid mixing chamber within the housing, the mixing chamber comprising a mixing chamber inlet coupled to each of the diesel particulate filter outlets and a mixing chamber outlet;
first and second selective catalytic reduction (SCR) converters within the housing, each SCR converter comprising an SCR inlet coupled to the mixing chamber outlet and an SCR outlet coupled to the exhaust gas outlet;
wherein the housing has a length and comprising mounting brackets for coupling the housing to at least one of the frame rails with the length of the housing being oriented in the lengthwise direction; and
wherein the housing comprises a recess extending at least partially along the length of the housing for at least partially receiving one of the vehicle frame rails, with the mounting brackets being positioned for mounting to the received one of the vehicle frame rails.

7. An exhaust gas treatment system according to claim 6 wherein a portion of the housing below the recess protrudes underneath the received one of the vehicle frame rails when the housing is mounted to the received one of the vehicle frame rails.

8. An exhaust gas treatment system according to claim 6 comprising plural steps each coupled to the housing by at least one bracket.

9. An exhaust gas treatment system for treating exhaust gases from a diesel engine of a land vehicle, the land vehicle comprising first and second elongated vehicle frame rails that extend in a lengthwise direction of the vehicle, the exhaust gas treatment system comprising:
a housing for coupling to at least one of the frame rails and comprising an exhaust gas inlet and an exhaust gas outlet;
first and second diesel particulate filters within the housing, each diesel particulate filter comprising a diesel particulate filter inlet coupled to the exhaust gas inlet and a diesel particulate filter outlet;
a diesel exhaust fluid mixing chamber within the housing, the mixing chamber comprising a mixing chamber inlet coupled to each of the diesel particulate filter outlets and a mixing chamber outlet; and
first and second selective catalytic reduction (SCR) converters within the housing, each SCR converter comprising an SCR inlet coupled to the mixing chamber outlet and an SCR outlet coupled to the exhaust gas outlet; and
wherein the first and second diesel particulate filters comprise an exhaust gas flow path through the diesel particulate filter that extends generally in a first direction through the first and second diesel particulate filters from the respective diesel particulate filter inlets to the respective diesel particulate filter outlets;
the diesel exhaust fluid mixing chamber being oriented to define an exhaust gas flow path through the mixing chamber that is generally in a second direction opposite to the first direction; and
the first and second SCR converters being oriented to define an exhaust gas flow path through the SCR converters that is generally in the first direction.

10. An exhaust gas treatment system according to claim 9 wherein the first, second and third directions are parallel to the first and second vehicle frame rails when the housing is coupled to the at least one of the vehicle frame rails.

11. An exhaust gas treatment system for treating exhaust gases from a diesel engine of a land vehicle, the land vehicle comprising first and second elongated vehicle frame rails that extend in a lengthwise direction of the vehicle, the exhaust gas treatment system comprising:
a housing for coupling to at least one of the frame rails and comprising an exhaust gas inlet and an exhaust gas outlet;
first and second diesel particulate filters within the housing, each diesel particulate filter comprising a diesel particulate filter inlet coupled to the exhaust gas inlet and a diesel particulate filter outlet;
a diesel exhaust fluid mixing chamber within the housing, the mixing chamber comprising a mixing chamber inlet coupled to each of the diesel particulate filter outlets and a mixing chamber outlet; and
first and second selective catalytic reduction (SCR) converters within the housing, each SCR converter comprising an SCR inlet coupled to the mixing chamber outlet and an SCR outlet coupled to the exhaust gas outlet;
comprising an exhaust gas flow path communicating from the exhaust inlet to the exhaust outlet, the first and second diesel particulate filters, the diesel exhaust fluid mixing chamber and the first and second SCR converters being included in the exhaust gas flow path, the diesel particulate filters being included in respective first and second sections of the exhaust gas flow path, the SCR converters being included in respective third and fourth sections of the exhaust gas flow path, the housing comprising a first transition portion in the exhaust gas flow path coupling the exhaust inlet to the diesel particulate filter inlets, a second transition portion coupling the diesel particulate filter outlets to the diesel exhaust fluid mixing chamber inlet, a third transition portion in the exhaust gas flow path coupling the diesel exhaust fluid mixing chamber outlet to the SCR converter inlets, and a fourth transition portion in the exhaust gas flow path coupling the SCR converter outlets to the exhaust gas outlet; and wherein the housing comprises first and second housing end portions, the first housing end portion comprising the first and third transition portions and the second housing end portions comprising the second and fourth transition portions.

12. An exhaust gas treatment system according to claim 11 wherein the first end portion is positioned forwardly toward the front of the land vehicle when the housing is coupled to at least one of the frame rails.

13. An exhaust gas treatment system for treating exhaust gases from a diesel engine of a land vehicle, the land vehicle comprising first and second elongated vehicle frame rails that extend in a lengthwise direction of the vehicle, the exhaust gas treatment system comprising:

a housing for coupling to at least one of the frame rails and comprising an exhaust gas inlet and an exhaust gas outlet;

first and second diesel particulate filters within the housing, each diesel particulate filter comprising a diesel particulate filter inlet coupled to the exhaust gas inlet and a diesel particulate filter outlet;

a diesel exhaust fluid mixing chamber within the housing, the mixing chamber comprising a mixing chamber inlet coupled to each of the diesel particulate filter outlets and a mixing chamber outlet; and first and second selective catalytic reduction (SCR) converters within the housing, each SCR converter comprising an SCR inlet coupled to the mixing chamber outlet and an SCR outlet coupled to the exhaust gas outlet;

comprising an exhaust gas flow path communicating from the exhaust inlet to the exhaust outlet, the first and second diesel particulate filters, the diesel exhaust fluid mixing chamber and the first and second SCR converters being included in the exhaust gas flow path, the diesel particulate filters being included in respective first and second sections of the exhaust gas flow path, the SCR converters being included in respective third and fourth sections of the exhaust gas flow path, the housing comprising a first transition portion in the exhaust gas flow path coupling the exhaust inlet to the diesel particulate filter inlets, a second transition portion coupling the diesel particulate filter outlets to the diesel exhaust fluid mixing chamber inlet, a third transition portion in the exhaust gas flow path coupling the diesel exhaust fluid mixing chamber outlet to the SCR converter inlets, and a fourth transition portion in the exhaust gas flow path coupling the SCR converter outlets to the exhaust gas outlet; and wherein the diesel particulate filters, diesel exhaust fluid mixing chamber and SCR converters are oriented and configured such that exhaust flows from the exhaust inlet to the first transition portion and generally in a first lengthwise direction from the first transition portion through the first and second diesel particulate filters, reverses direction in the second transition portion and flows generally in a second lengthwise direction opposite to the first lengthwise direction from the second transition portion and through the diesel exhaust fluid mixing chamber and to the third transition portion, the exhaust reversing direction in the third transition portion and flowing in a third lengthwise direction opposite to the second direction through the first and second SCR converters to the fourth transition portion and then from the fourth transition portion to the exhaust outlet.

14. An exhaust treatment system according to claim 13 wherein the housing comprises a first housing end portion and a second housing end portion, the first and third directions being in the direction from the first housing end portion toward the second housing end portion and the second direction being in the direction from the second housing end portion toward the first housing end portion.

15. An exhaust gas treatment system according to claim 13 wherein the first, second and third directions are generally parallel to the first and second vehicle frame rails when the housing is coupled to at least one of the vehicle frame rails.

16. An exhaust gas treatment system according to claim 13 wherein at least major portions of the first, second and third lengthwise directions are parallel to the first and second frame rails when the housing is coupled to the at least one of the first and second frame rails.

17. An exhaust gas treatment system for treating exhaust gases from a diesel engine of a land vehicle, the land vehicle comprising first and second elongated vehicle frame rails that extend in a lengthwise direction of the vehicle, the exhaust gas treatment system comprising:

a housing for coupling to at least one of the frame rails and comprising an exhaust gas inlet and an exhaust gas outlet;

first and second diesel particulate filters within the housing, each diesel particulate filter comprising a diesel particulate filter inlet coupled to the exhaust gas inlet and a diesel particulate filter outlet;

a diesel exhaust fluid mixing chamber within the housing, the mixing chamber comprising a mixing chamber inlet coupled to each of the diesel particulate filter outlets and a mixing chamber outlet; and first and second selective catalytic reduction (SCR) converters within the housing, each SCR converter comprising an SCR inlet coupled to the mixing chamber outlet and an SCR outlet coupled to the exhaust gas outlet;

comprising an exhaust gas flow path communicating from the exhaust inlet to the exhaust outlet, the first and second diesel particulate filters, the diesel exhaust fluid mixing chamber and the first and second SCR converters being included in the exhaust gas flow path, the diesel particulate filters being included in respective first and second sections of the exhaust gas flow path, the SCR converters being included in respective third and fourth sections of the exhaust gas flow path, the housing comprising a first transition portion in the exhaust gas flow path coupling the exhaust inlet to the diesel particulate filter inlets, a second transition portion coupling the diesel particulate filter outlets to the diesel exhaust fluid mixing chamber inlet, a third transition portion in the exhaust gas flow path coupling the diesel exhaust fluid mixing chamber outlet to the SCR converter inlets, and a fourth transition portion in the exhaust gas flow path coupling the SCR converter outlets to the exhaust gas outlet; and wherein the first, second, third and fourth sections of the exhaust flow path are parallel to one another.

18. A housing for an exhaust treatment system for a diesel engine, the exhaust treatment system comprising exhaust treatment components comprising at least one diesel particulate filter, a diesel exhaust fluid mixing chamber and at least one selective catalytic reduction (SCR) converter, the housing comprising:

an exhaust gas inlet and an exhaust gas outlet, wherein an exhaust gas flow path is provided through the exhaust treatment components from the exhaust inlet to the exhaust outlet;

a longitudinally extending protrusion, the housing being mounted to the vehicle with the frame rail positioned at least in part directly above a portion of the protrusion, at least one of the exhaust treatment components being positioned at least partially in the portion of the housing comprising the protrusion;

wherein the housing has a length and comprising mounting brackets for coupling the housing to at least one of the frame rails with the length of housing being oriented in the lengthwise direction;

wherein the protrusion extends along substantially the entire length of the housing; and comprising plural steps each coupled to the housing by at least one bracket.

19. A method of treating exhaust from a diesel engine of a land vehicle comprising:

splitting an exhaust stream from an exhaust inlet into first and second exhaust streams;

passing the first exhaust stream in a first direction through a first diesel particulate filter and passing the second exhaust stream in the first direction though a second diesel particulate filter;

recombining the first and second exhaust streams into a third exhaust stream downstream from the first and second particulate filters;

passing the third exhaust stream in a second direction opposite to the first direction, through a diesel exhaust fluid mixing chamber;

splitting the third exhaust stream into fourth and fifth exhaust streams;

passing the fourth exhaust stream in a third direction opposite to the second direction through a first selective catalytic reduction converter and passing the fifth exhaust stream in the third direction through a second selective catalyst reduction converter;

recombining the fourth and fifth exhaust streams downstream of the first and second selective catalyst reduction converters into a sixth exhaust stream;

passing the sixth exhaust stream to an exhaust outlet; and combining the first, second, third, fourth and fifth exhaust streams, first and second diesel particulate filters, the diesel exhaust fluid mixing chamber and the first and second selective catalyst reduction converters in a common housing.

* * * * *

UNITED STATES PATENT AND TRADEMARK OFFICE
CERTIFICATE OF CORRECTION

PATENT NO.        : 8,230,678 B2           Page 1 of 1
APPLICATION NO.   : 12/214271
DATED             : July 31, 2012
INVENTOR(S)       : Rakesh Aneja et al.

It is certified that error appears in the above-identified patent and that said Letters Patent is hereby corrected as shown below:

In the Claims:

Column 15, line 3, Claim 2, "housing a second" should read -- housing to a second --

Signed and Sealed this
First Day of July, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,230,678 B2  
APPLICATION NO. : 12/214271  
DATED : July 31, 2012  
INVENTOR(S) : Rakesh Aneja et al.

It is certified that error appears in the above-identified patent and that said Letters Patent is hereby corrected as shown below:

In the Claims:

Column 15, line 2, Claim 2, "housing a second" should read -- housing to a second --

This certificate supersedes the Certificate of Correction issued July 1, 2014.

Signed and Sealed this
Fifth Day of August, 2014

Michelle K. Lee
*Deputy Director of the United States Patent and Trademark Office*